(12) United States Patent
Kawai et al.

(10) Patent No.: US 8,320,024 B2
(45) Date of Patent: Nov. 27, 2012

(54) METHOD AND APPARATUS FOR IMAGE FORMING AND COMPUTER PROGRAM PRODUCT

(75) Inventors: Yoshiaki Kawai, Kanagawa (JP);
Shingo Nishizaki, Kanagawa (JP);
Makoto Higashiyama, Kanagawa (JP);
Tomohide Kondoh, Kanagawa (JP);
Masashi Suzuki, Saitama (JP)

(73) Assignee: Ricoh Company, Limited, Tokyo (JP)

(*) Notice: Subject to any disclaimer, the term of this patent is extended or adjusted under 35 U.S.C. 154(b) by 914 days.

(21) Appl. No.: 12/404,601

(22) Filed: Mar. 16, 2009

(65) Prior Publication Data
US 2009/0231606 A1 Sep. 17, 2009

(30) Foreign Application Priority Data

Mar. 17, 2008 (JP) .................. 2008-068202
Jan. 28, 2009 (JP) .................. 2009-016733

(51) Int. Cl.
*H04N 1/405* (2006.01)
*G06T 5/00* (2006.01)
(52) U.S. Cl. ...... 358/3.26; 358/1.9; 358/3.21; 358/3.24; 358/3.27; 358/504; 358/518; 382/254; 382/260; 382/266; 382/275
(58) Field of Classification Search .................. 358/1.9, 358/2.99–3.02, 3.26–3.27, 518, 523
See application file for complete search history.

(56) References Cited

U.S. PATENT DOCUMENTS

| | | | | |
|---|---|---|---|---|
| 6,236,827 | B1* | 5/2001 | Hada | 399/301 |
| 7,382,385 | B2* | 6/2008 | Breen et al. | 347/116 |
| 7,466,472 | B2 | 12/2008 | Kawai | |
| 7,742,189 | B2* | 6/2010 | Sobue | 358/1.7 |
| 7,843,604 | B2* | 11/2010 | Higashiyama et al. | 358/1.9 |
| 7,898,695 | B1* | 3/2011 | Damon et al. | 358/3.26 |
| 2003/0174364 | A1* | 9/2003 | Goto | 358/3.26 |
| 2006/0092264 | A1* | 5/2006 | Matsuzaki et al. | 347/233 |
| 2006/0226338 | A1* | 10/2006 | Tojima et al. | 250/208.1 |
| 2007/0140721 | A1 | 6/2007 | Shinohara et al. | |
| 2008/0174799 | A1 | 7/2008 | Higashiyama et al. | |
| 2008/0174834 | A1* | 7/2008 | Ueda et al. | 358/488 |
| 2009/0073472 | A1* | 3/2009 | Aiko | 358/1.9 |

FOREIGN PATENT DOCUMENTS

JP 3715349 9/2005

* cited by examiner

*Primary Examiner* — King Poon
*Assistant Examiner* — Richard Zhu
(74) *Attorney, Agent, or Firm* — Oblon, Spivak, McClelland, Maier & Neustadt, L.L.P.

(57) ABSTRACT

An image forming apparatus capable of minimizing degradation in density correction as a part of skew correction includes a noise-occurrence determining unit, a correction-target-pixel selecting unit, a density correcting unit, and a phase correcting unit. When the noise-occurrence determining unit determines that noise would appear, the density correcting unit performs density correction on a correction target pixel that is determined by the correction-target-pixel selecting unit. The phase correcting unit corrects an output point in time of image data of the density-corrected correction target pixel in a pixel period during which the image data can be output so as to output the image data at a position displaced away from a shift position or toward a shift position.

6 Claims, 28 Drawing Sheets

FIG. 10
| REFERENCE COLOR | K |
|---|---|
| K-SKEW AMOUNT [μm] | 0 |
| M-SKEW AMOUNT [μm] | -110 |
| C-SKEW AMOUNT [μm] | -130 |
| Y-SKEW AMOUNT [μm] | 30 |
FIG. 11
| REFERENCE COLOR | K |
|---|---|
| K-SKEW CORRECTION AMOUNT (LINES) | 0 |
| M-SKEW CORRECTION AMOUNT (LINES) | +3 |
| C-SKEW CORRECTION AMOUNT (LINES) | +3 |
| Y-SKEW CORRECTION AMOUNT (LINES) | -1 |
FIG. 12
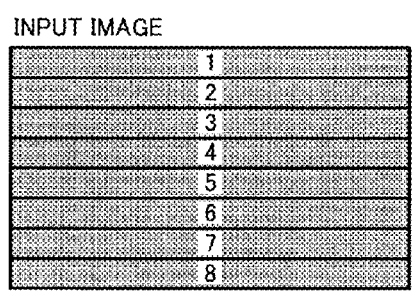
FIG. 13
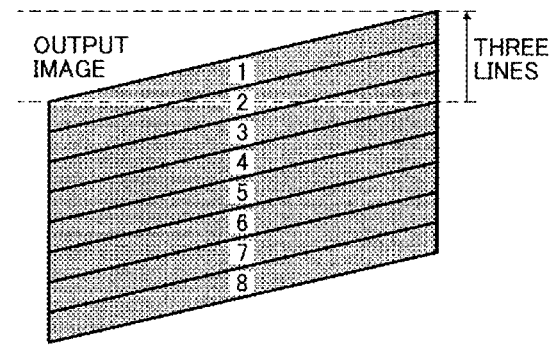
FIG. 14
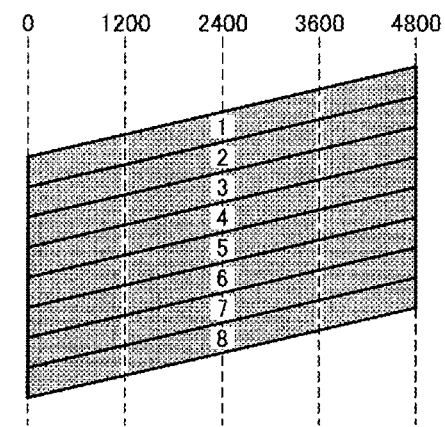
FIG. 15
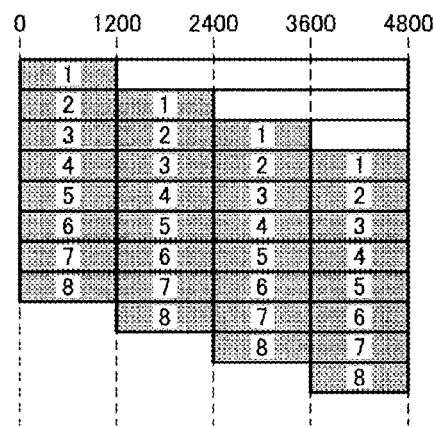

FIG. 16
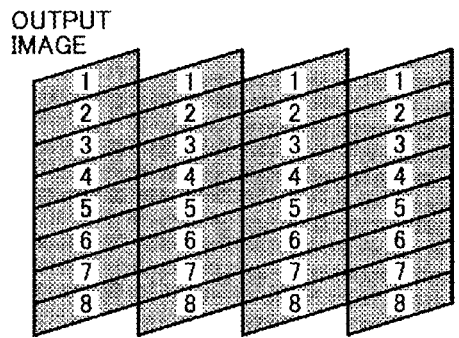
FIG. 17
| | 1 | 2 | 3 | 4 |
|---|---|---|---|---|
| SHIFT POSITION | 1200 | 2400 | 3600 | |
| SHIFT DIRECTION | −ve | −ve | −ve | |
FIG. 18
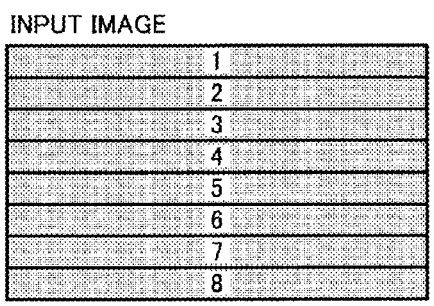
FIG. 19
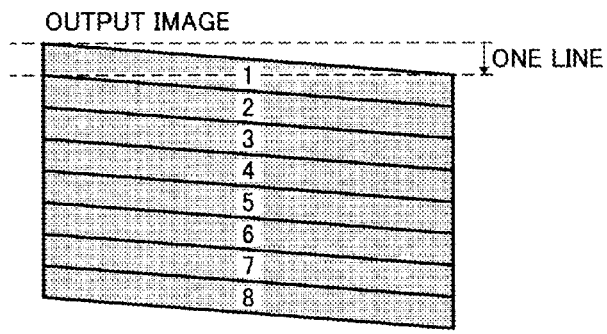

FIG. 20
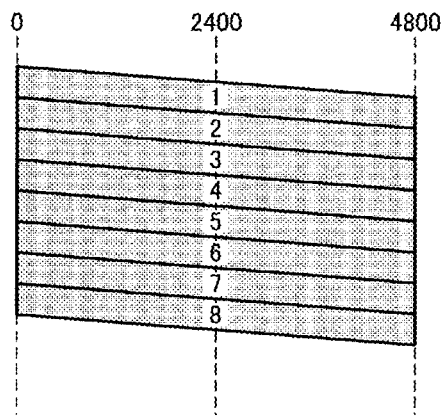
FIG. 21
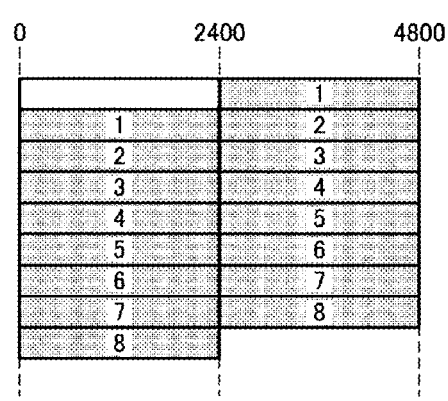
FIG. 22
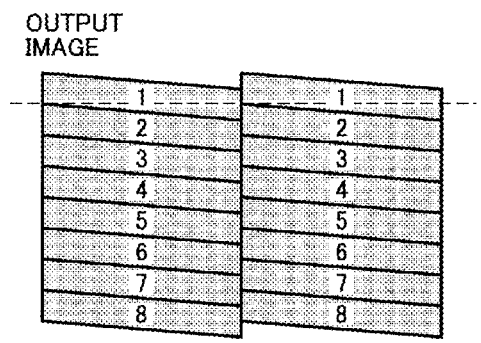
FIG. 23
|  | 1 | 2 | 3 | 4 |
|---|---|---|---|---|
| SHIFT POSITION | 1200 |  |  |  |
| SHIFT DIRECTION | +ve |  |  |  |

| PATTERN No. | CORREC-TION TARGET PIXEL | UPPER NEIGH-BORING PIXEL | LOWER NEIGH-BORING PIXEL | LEFT NEIGH-BORING PIXEL | RIGHT NEIGH-BORING PIXEL | DENSITY CORREC-TION VALUE |
|---|---|---|---|---|---|---|
| 1 | 15 | 0 | 0 | 0 | 0 | -3 |
| 2 | 15 | 15 | 0 | 0 | 0 | -4 |
| 3 | 15 | 0 | 15 | 0 | 0 | -4 |
| 4 | 15 | 0 | 0 | 0 | 15 | -4 |
| 5 | 15 | 15 | 0 | 0 | 15 | -5 |
| 6 | 15 | 15 | 15 | 0 | 0 | -5 |
| 7 | 15 | 0 | 15 | 0 | 15 | -5 |
| 8 | 15 | 15 | 15 | 0 | 15 | -6 |

BEFORE SHIFTING

AFTER SHIFTING RIGHT-SIDE DOWNWARD

IDEAL DENSITY CORRECTION

DENSITY CORRECTION

METHOD AND APPARATUS FOR IMAGE FORMING AND COMPUTER PROGRAM PRODUCT

CROSS-REFERENCE TO RELATED APPLICATIONS

The present application claims priority to and incorporates by reference the entire contents of Japanese priority document 2008-068202 filed in Japan on Mar. 17, 2008 and Japanese priority document 2009-016733 filed in Japan on Jan. 28, 2009.

BACKGROUND OF THE INVENTION

1. Field of the Invention

The present invention relates to a technology for correcting color misalignment in an image forming apparatus.

2. Description of the Related Art

Occurrence of color misalignment is a critical problem in color image forming apparatuses. For this purpose, typical color image forming apparatuses have a function of detecting and reducing color misalignment. To implement such a function, in one approach, toner patterns of different colors are formed on a transfer belt, those toner patterns are detected with a photosensor, amounts of color misalignment for various causes are calculated based on the result of detection of the tonner patterns, and a feedback control is performed based on the calculated amounts of color misalignment. Examples of the causes include main-scanning-direction misregistration, sub-scanning-direction misregistration, main-scanning-direction magnification error, and skew. A feedback correction for compensating the calculated misalignment amounts is then performed to reduce the misalignment.

A color image forming apparatus performs the feedback correction at various occasions to constantly limit each misalignment amount below a predetermined value. Such feedback correction is performed, for example, when the image forming apparatus is turned on, when the image forming apparatus undergoes an environmental change such as a temperature change, and when a print count of the image forming apparatus reaches a predetermined number.

Examples of the method for correcting the color-to-color misalignment will be explained below. The main-scanning-direction misregistration and the sub-scanning-direction misregistration can be corrected by adjusting write-start timing of a laser beam on a photosensitive drum.

The main-scanning-direction magnification error can be electrically corrected by adjusting a pixel clock.

Skew of a laser beam that performs scanning exposure can be corrected mechanically, or by using an image processing technique. The method of mechanically correcting the skew uses an adjusting mechanism that is used to adjust a position of a mirror inside a laser-beam write unit to correct the skew. However, to implement this method automatically, an actuator such as a mirror-displacing motor is required to move the mirror, which means additional cost. This method is further disadvantageous in making it difficult to configure the laser-beam write unit compact.

The image processing technique for correcting the skew of a laser beam is as follows. A portion of image data is stored in a line memory that has a capacity to store therein one line of image data in the main-scanning direction. Pixels belonging to the one line of the image data in the line memory are then divided into a plurality of pixel blocks. When reading (outputting) the image data in each of the pixel blocks in the line memory, the order of reading the image data in each of the pixel blocks is changed so that the image data is shifted in a direction opposite to a skew direction. Accordingly, color-to-color skew can be corrected. Because this method requires only one additional line memory of a size corresponding to a desired correction area, this method is advantageous in being implementable with a relatively small additional cost as compared with that of the mechanical correcting method. This correcting method based on the image processing technique is effective not only for skew correction but also for reducing the degree of distortion resulting from the property of a lens in the laser-beam write unit or the like.

However, the method based on the image processing technique is disadvantageous in that because relation between neighboring pixels on a shift position changes, a color density can be locally increased or decreased. This can result in banding noise extending in the sub-scanning direction on an output image (for example, an image printed on a printing paper). In particular, such local color density increase or decrease frequently occurs on an image that is processed by using a digital halftoning method such as dithering, and produces banding noise extending in the sub-scanning direction.

Japanese Patent No. 3715349 discloses a conventional technique for correcting skew of an image and reducing banding noise that can result from the skew correction. In the conventional technique, it is determined whether a pixel of interest is at a shift position. If the pixel of interest is at the shift position, and when a neighboring pixel in the main-scanning direction of the pixel of interest has changed and a pixel pattern of pixels in the vicinity of the pixel of interest matches with a predetermined pattern, density correction is performed for the pixel of interest. This density correction is performed according to a set of the matched pattern and the position where the neighboring pixel changes.

Although the conventional technology disclosed in Japanese Patent No. 3715349 teaches to perform the density correction of the pixel of interest, it does not teach output timing of the pixel of interest in a pixel period during which the pixel of interest having undergone the density correction can be output. Accordingly, the conventional technology is disadvantageous in that the density correction performed on the pixel of interest can lead to color density change, although which is a small change, even in a portion where banding noise resulting from the density correction does not occur.

SUMMARY OF THE INVENTION

It is an object of the present invention to at least partially solve the problems in the conventional technology.

According to an aspect of the present invention, there is provided an image forming apparatus including a skew correction unit that performs skew correction on image data by dividing pixels that belong to one line in a main-scanning direction of the image data into pixel blocks at at least one shift position and shifting a pixel block of the pixel blocks in a sub-scanning direction against a direction of skew; a noise determining unit that determines whether a pixel of interest that is on the shift position is a noise-inducing pixel, the pixel of interest being each pixel on the shift position, the noise-inducing pixel being a pixel that leads to a local color density change because of a change in relationship with an adjacent pixel of the noise-inducing pixel; a selecting unit that selects, when the pixel of interest is determined as being the noise-inducing pixel, any one of the pixel of interest and a pixel in vicinity of the pixel of interest as a correction target pixel on which color density correction is to be performed; a first correcting unit that performs the color density correction on density-not-yet-corrected image data of the correction target pixel to acquire density-corrected image data; and a second correcting unit that corrects an output point in time at which the density-corrected image data is to be output, the output point in time falling within a pixel period during which the density-corrected image data of the correction target pixel can be output, such that the image data of the correction target pixel is output at an output position that is displaced from a center position corresponding to a center point in time of the pixel period in any one of a direction toward the shift position and a direction away from the shift position.

According to another aspect of the present invention, there is provided an image forming method including performing skew correction on image data by dividing pixels that belong to one line in a main-scanning direction of the image data into pixel blocks at least one shift position and shifting a pixel block of the pixel blocks in a sub-scanning direction against a direction of skew; determining whether a pixel of interest that is on the shift position is a noise-inducing pixel, the pixel of interest being each pixel on the shift position, the noise-inducing pixel being a pixel that leads to a local color density change because of a change in relationship with an adjacent pixel of the noise-inducing pixel; selecting, when the pixel of interest is determined as being the noise-inducing pixel at the determining, any one of the pixel of interest and a pixel in vicinity of the pixel of interest as a correction target pixel on which color density correction is to be performed; performing the color density correction on density-not-yet-corrected image data of the correction target pixel to acquire density-corrected image data; and correcting an output point in time at which the density-corrected image data is to be output, the output point in time falling within a pixel period during which the density-corrected image data of the correction target pixel can be output, such that the image data of the correction target pixel is output at an output position that is displaced from a center position corresponding to a center point in time of the pixel period in any one of a direction toward the shift position and a direction away from the shift position.

According to still another aspect of the present invention, there is provided a computer program product that includes a computer-readable recording medium and a computer program stored on the readable recording medium, the computer program when executed on a computer causes the computer to execute the above image forming method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a table of exemplary skew amounts relative to a reference color K (black) for a resolution of 600 dots per inch (dpi) in the sub-scanning direction;

FIG. 11 is a table of exemplary skew correction amounts obtained from the skew amounts in the table of FIG. 10;

FIGS. 12 to 17 are schematic diagrams for explaining a first skew correction method by way of an example;

FIGS. 18 to 23 are schematic diagrams for explaining a second skew correction method by way of an example;

DETAILED DESCRIPTION OF THE PREFERRED EMBODIMENTS

Exemplary embodiments of the present invention are described in detail below with reference to the accompanying drawings. Color copiers will be described below as specific examples of image forming apparatuses according to the embodiments. However, applications of the present invention are not limited to color copiers, and the present invention can be applied to any apparatus that performs skew correction by means of image processing. Examples of such an apparatus include a facsimile and a multifunction product (MFP) that performs more than one function in a single casing, such as copying, faxing, scanning, and printing. The configuration of a color copier and skew correction according to an embodiment of the present invention will be described first, which will be followed by descriptions about the configuration and the skew correction that feature the present embodiment.

Figure 1:
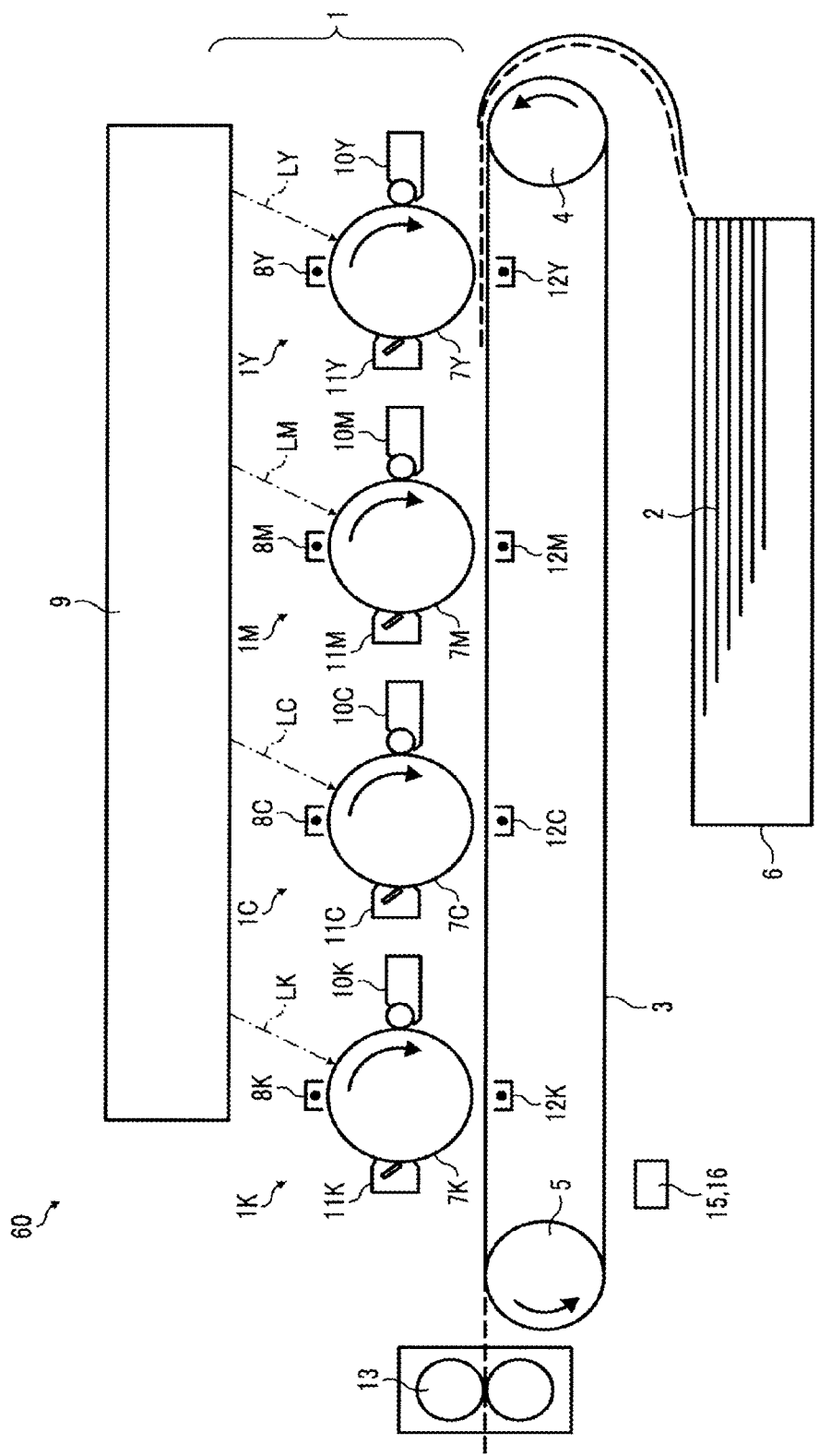
FIG. 1 is a schematic front view of an image forming unit, an exposure unit, and a transfer belt for explaining an image forming principle of a color copier according to a first embodiment of the present invention.

A principle of image forming to be performed by a color copier 60 according to a first embodiment of the present invention will be described with reference to FIG. 1. As depicted in FIG. 1, the color copier 60 includes an image forming unit 1, an exposure unit 9, and a transfer belt 3. The color copier 60 forms images on a transfer sheet by using the technique of electrophotography.

The color copier 60 is a what is called tandem-type image forming apparatus, moreover, the color copier 60 employs a direct transfer method. In this color copier 60, image forming units 1Y, 1M, 1C, and 1K that form images of four colors (yellow (Y), magenta (M), cyan (C), and black (K)) are linearly arranged in the direction of movement of the endless transfer belt 3. The transfer belt 3 conveys a transfer sheet 2 sequentially from under the image forming unit 1Y to the image forming unit 1K. The image forming units 1Y, 1M, 1C, and 1K are parts of the image forming unit 1. Meanwhile, in the following description, units being identical in configuration but different from one another only in toner color will be referred to with a reference symbol indicating the color omitted from its reference numeral in some cases. For example, the term "the image forming unit 1" will be used below to denote an arbitrary one of the image forming units 1Y, 1M, 1C, and 1K. The transfer sheet 2 is a transfer medium such as a printing paper.

The transfer belt 3 is wound around a drive roller 4 that rotates as a driving member and a driven roller 5 that is rotated by the drive roller 4. As the drive roller 4 rotates, the transfer belt 3 is rotated. One or more pieces of the transfer sheets 2 are stacked in a paper feed tray 6 that is arranged below the transfer belt 3. The topmost one of the transfer sheets 2 is fed toward the transfer belt 3 by using a not shown conveying mechanism. The transfer sheet 2 sticks onto the surface of the transfer belt 3 by electrostatic attraction. The transfer sheet 2 is then conveyed to a position that is under the image forming unit 1Y to form a Y-toner image on the transfer sheet 2.

The image forming unit 1 includes a photosensitive drum 7 (7Y, 7M, 7C, 7K), an electrostatic charger 8 (8Y, 8M, 8C, 8K), a developing unit 10 (10Y, 10M, 10C, 10K), a photosensitive drum cleaner 11 (11Y, 11M, 11C, 11K), and a transfer unit 12 (12Y, 12M, 12C, 12K). The electrostatic charger 8, the developing unit 10, the photosensitive drum cleaner 11, and the transfer unit 12 are arranged around the photosensitive drum 7.

The surface of the photosensitive drum 7Y of the image forming unit 1Y is uniformly charged by the electrostatic charger 8Y, thereafter exposed to a laser beam LY in the exposure unit 9 for a yellow toner image. Hence, a latent image is formed on the surface of the photosensitive drum 7Y. The developing unit 10Y develops this latent image and forms a toner image on the photosensitive drum 7Y. The transfer unit 12Y transfers this toner image onto the transfer sheet 2 at a position (transfer position) where the photosensitive drum 7Y comes into contact with the transfer sheet 2 on the transfer belt 3. Hence, a single-color i.e., yellow, image is formed on the transfer sheet 2. Residual toner is removed from the photosensitive drum 7Y, from which the image has been transferred, by the photosensitive drum cleaner 11Y to prepare the photosensitive drum 7Y for subsequent image forming.

The transfer sheet 2 onto which the single-color (Y)-toner image has been transferred by the image forming unit 1Y is conveyed to the image forming unit 1M by the transfer belt 3. In the image forming unit 1M, an M-toner image is similarly formed on the photosensitive drum 7M and transferred in a superimposed manner onto the transfer sheet 2. The transfer sheet 2 is subsequently conveyed to the image forming units 1C and 1K in this order where a C-toner image and a K-toner image are similarly formed, respectively, and transferred onto the transfer sheet 2 to form a full-color image on the transfer sheet 2.

When the transfer sheet 2 on which the full-color image is formed comes out of the image forming unit 1K, the transfer sheet 2 is peeled away from the transfer belt 3. The full-color image is fixed onto the transfer sheet 2 in a fixing unit 13. Thereafter, the transfer sheet 2 is discharged out of the color copier 60.

Occurrence of color misalignment is a critical problem in tandem-type color image forming apparatuses. How the color copier 60 corrects color-to-color misalignment will be described below.

When performing color-to-color misalignment, correction patterns 14 of the four colors of are formed on the transfer belt 3 in the manner explained above. Optical detection sensors 15 and 16 detect the correction patterns 14 and output detection signals for use in calculation of color-to-color misalignment amounts for each of the various causes of the color-to-color misalignment. The causes of the color-to-color misalignment can be main-scanning-direction misregistration and sub-scanning-direction misregistration, main-scanning-direction magnification error, and skew. The main-scanning direction is orthogonal to the direction of movement of the transfer belt 3, i.e., parallel to rotation axes of the photosensitive drums 7Y, 7M, 7C, and 7K. The sub-scanning direction is parallel to the direction of movement of the transfer belt 3, i.e., perpendicular to the rotation axes of the photosensitive drums 7Y, 7M, 7C, and 7K. The misalignment amounts are compensated for each of the causes to correct the misalignment. The color copier 60 corrects color-to-color misalignment by using the correction patterns 14 prior to actually forming a full-color image on the transfer sheet 2.

Figure 2:
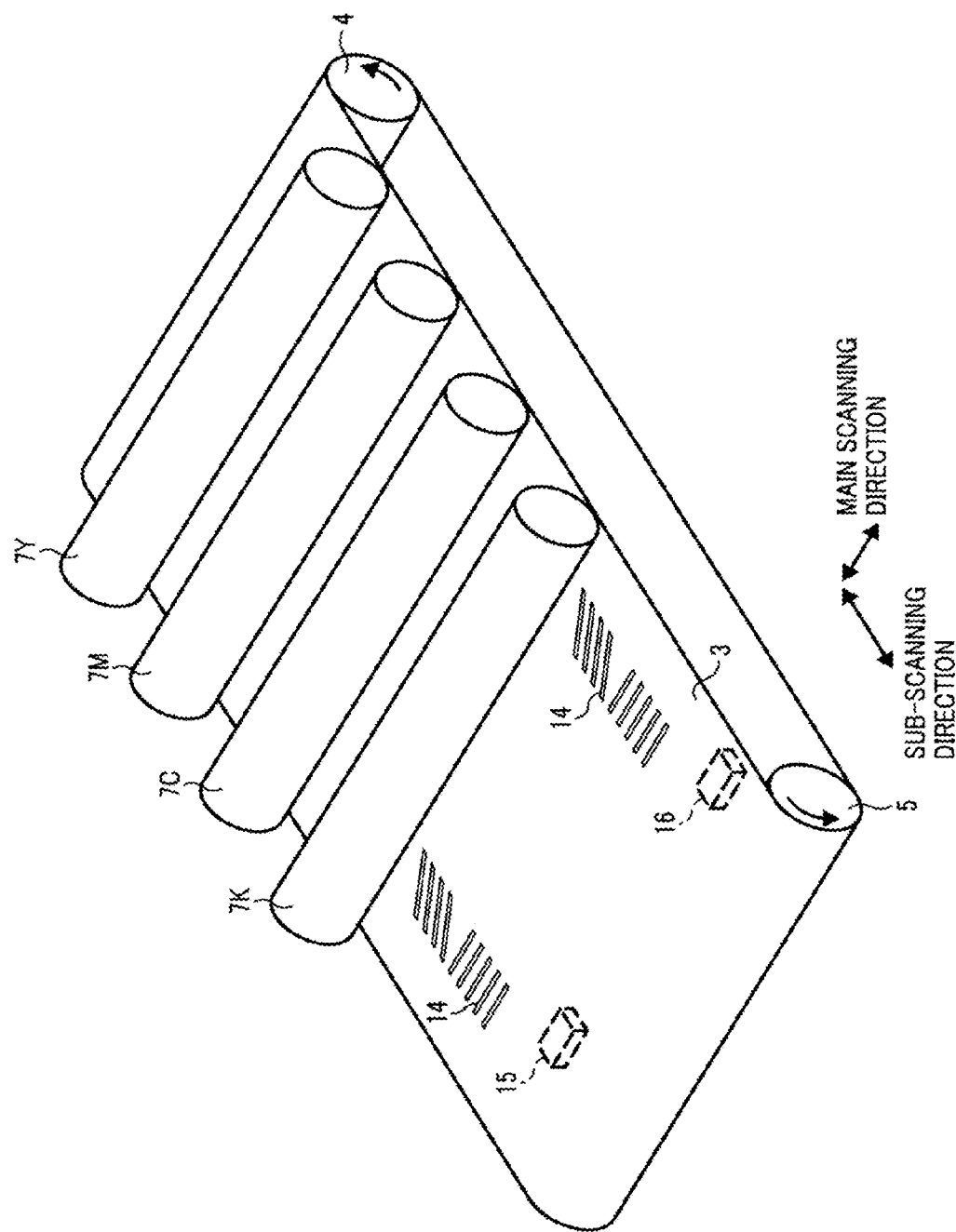
FIG. 2 is a perspective view of a transfer belt, on which correction patterns are formed, of the color copier depicted in FIG. 1.

FIG. 2 is a perspective view of the transfer belt 3 on which the correction patterns 14 are formed. In the color copier 60, the image forming units 1Y, 1M, 1C, and 1K form the correction patterns 14 for use in correction of color-to-color misalignment on the transfer belt 3. The correction patterns 14 are detected by the detection sensors 15 and 16. In the example depicted in FIG. 2, the detection sensors 15 and 16 are arranged on opposite ends of the transfer belt 3 in the main-scanning direction. The correction patterns 14 are formed on the transfer belt 3 at positions corresponding to the detection sensors 15 and 16. While the correction patterns 14 are moved by rotation of the transfer belt 3 in the direction depicted in FIG. 2, the correction patterns 14 are detected by the detection sensors 15 and 16 when the correction patterns 14 pass through detection areas of the detection sensors 15 and 16. When the correction patterns 14 are detected, various misalignment amounts are obtained by calculations based on the results of the detection. Examples of the misalignment amounts include main-scanning-direction magnification error amounts, main-scanning-direction misregistration amounts, sub-scanning direction misregistration amounts, skew amounts, and distortion amounts. Misalignment correction amounts for each of these misalignment components are calculated from the misalignment amounts.

Figure 3:
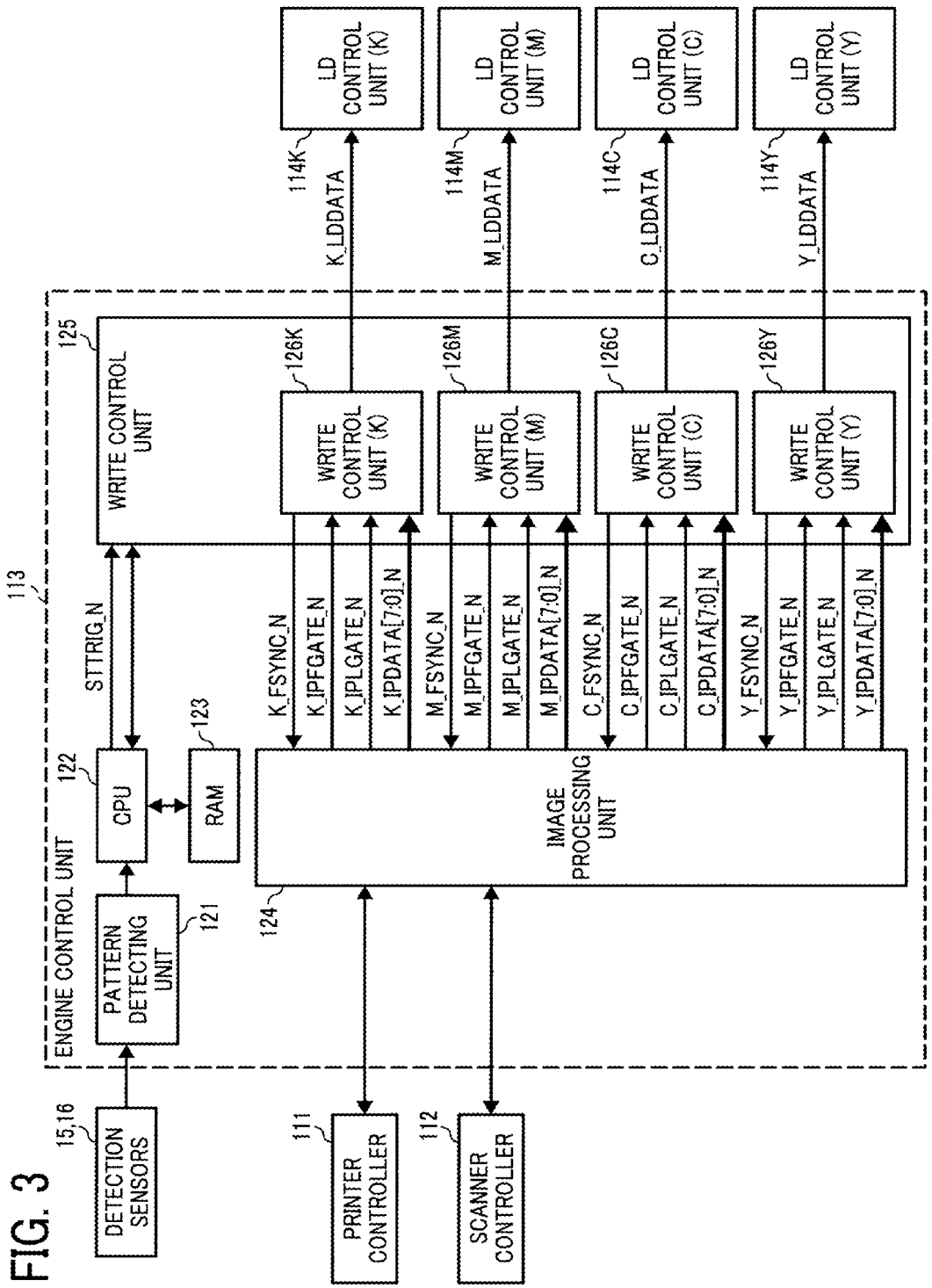
FIG. 3 is a block diagram of an exemplary configuration of a mechanism that performs write control and misalignment correction in the color copier depicted in FIG. 1.

A block diagram and operations relevant to control of the color copier 60 will be described below. FIG. 3 is a block diagram of an exemplary configuration of a mechanism of the color copier 60 that performs write control and misalignment correction. The color copier 60 that perform the misalignment correction includes, as processing units, the detection sensors 15 and 16, a printer controller 111, a scanner controller 112, an engine control unit 113, and laser diode (LD) control units 114 (114K, 114M, 114C, and 114Y).

The detection sensors 15 and 16 detect positions of the correction patterns 14 formed on the transfer belt 3. The detection sensors 15 and 16 output analog detection signals indicating the positions of the detected correction patterns 14 to the engine control unit 113.

The printer controller 111 receives image data transmitted from an external apparatus (e.g., a personal computer (PC)) via a network. The printer controller 111 transfers the received image data to the engine control unit 113 (an image processing unit 124, which will be described later).

The scanner controller 112 receives scanned image data of an original from a scanner (not shown). The scanner controller 112 transfers the received scanned image data to the engine control unit 113 (the image processing unit 124).

The engine control unit 113 includes a pattern detecting unit 121, a central processing unit (CPU) 122, a random access memory (RAM) 123, the image processing unit 124, and a write control unit 125.

The pattern detecting unit 121 receives the analog detection signals from the detection sensors 15 and 16 and amplifies the analog detection signals, converts the amplified analog detection signals into digital data, and stores the converted digital data in the RAM 123.

The CPU 122 calculates the positions of the correction patterns 14 according to the digital data stored in the RAM 123, calculates misalignment amounts from the calculated positions, and then calculates misalignment correction amounts based on the calculated misalignment amounts. The misalignment amounts can be a distortion amount, a magnification error amount in the main-scanning direction, a main-scanning direction misregistration amount, a sub-scanning direction misregistration amount, and a skew amount of each color. The misalignment correction amounts can be a distortion correction amount, a main-scanning-direction-magnification correction amount, a sub-scanning-direction-registration correction amount, a sub-scanning-direction-registration correction amount, and a skew correction amount of each color.

When K is set as a reference color, the CPU 122 calculates the numbers of distorted lines of Y, M, and C relative to the reference color K based on a resolution of image data and the calculated distortion amount of each color (Y, M, C, K). The CPU 122 determines the number of lines for a line memory of each color based on the number of distorted line relative to the reference color. The reference color is a color to be used as the reference for calculation of the distortion amount of colors other than the reference color. The reference color is assumed to be K (black).

The RAM 123 temporarily stores therein the digital data indicating the positions of the correction patterns 14 that is fed from the pattern detecting unit 121 via the CPU 122. Meanwhile, a nonvolatile memory can be used in place of the RAM 123. In this case, the digital data indicating the positions of the correction patterns 14 is stored in the nonvolatile memory.

The image processing unit 124 performs various image processing according to image data that is received by the printer controller 111 or that is transmitted from the scanner controller 112 to convert the image data into image data (e.g., 1-bit binary image data) of each color. In the first embodiment, based on sub-scanning timing signal (K,M,C,Y)_F-SYNC_N supplied from the write control unit 125 for each color, the image processing unit 124 transmits image data (K,M,C,Y)_IPDATA_N accompanied by main-scanning gate signal (K,M,C,Y)_IPLGATE_N and sub-scanning gate signal (K,M,C,Y)_IPFGATE_N, which are synchronization signals, to the write control unit 125.

The write control unit 125 includes a write control unit 126 (126K, 126M, 126C, and 126Y). The write control units 126K, 126M, 126C, and 126Y generates print timing signals that indicate the write control units 126K, 126M, 126C, and 126Y when to form latent images of the corresponding colors on the photosensitive drums 7Y, 7M, 7C, and 7K. According to the generated print timing signals, the write control unit 125 receives the image data and performs various write-control image processing of the received image data to convert the image data into LD light-emission data (K,M,C,Y)_LDDATA. The write control unit 125 transmits K_LDDATA, M_LDDATA, C_LDDATA, and Y_LDDATA to the LD control unit 114K, the LD control unit 114M, the LD control unit 114C, and the LD control unit 114Y, respectively.

The LD control units 114K, 114M, 114C, and 114Y are parts of the exposure unit 9. The LD control units 114K, 114M, 114C, and 114Y receive the LD light-emission data from the write control unit 125 and output drive signals to the exposure unit 9 according to the LD light-emission data. The exposure unit 9 controls emission of laser beams LY, LM, LC, and LK toward the photosensitive drums 7Y, 7M, 7C, and 7K according to the drive signals. As a result, the laser beam LY, LM, LC, and LK form latent images on the surfaces of the photosensitive drums 7Y, 7M, 7C, and 7K.

How the color copier 60 performs color image forming will be briefly described below. An image that is, for example, received from a personal computer (PC) is processed by any one of the printer controller 111 that performs processing for printing and the scanner controller 112 that performs processing for making a copy of the image. Resultant image data is transferred to the image processing unit 124 of the engine control unit 113. The image processing unit 124 performs various image processing on the image data, converts the processed image data into image data of each color, and transfers the image data to the write control unit 125. The write control unit 125 receives the image data, performs various write image processing on the image data, converts the processed image data into LD light-emission data, and causes the LDs to emit light to form a latent image on each of the photosensitive drums 7Y, 7M, 7C, and 7K based on the LD light-emission data.

Figure 4:
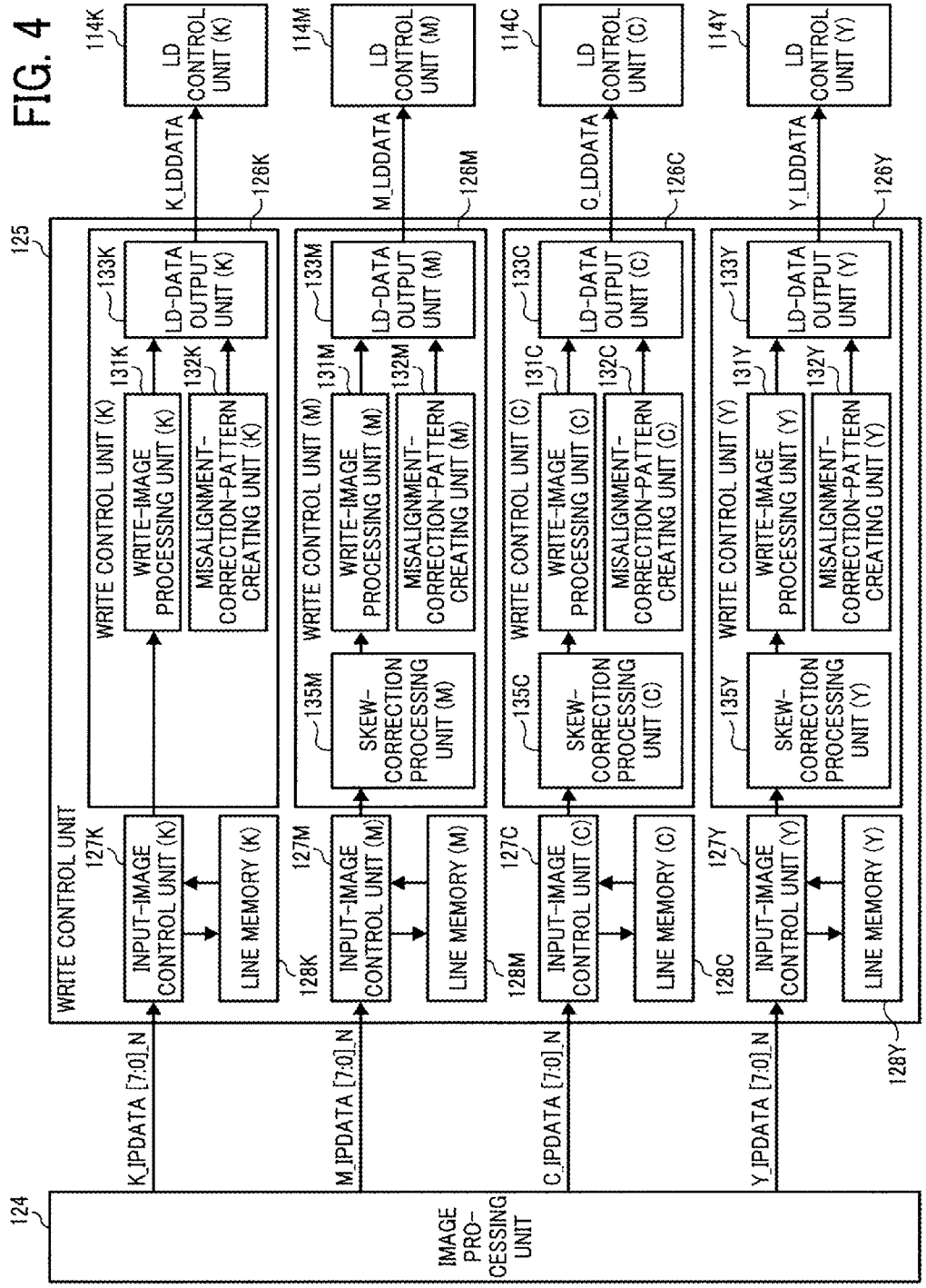
FIG. 4 is a block diagram of an exemplary configuration of a write control unit in the mechanism depicted in FIG. 3.

The write control unit 125 will be described in more detail with reference to FIG. 4. FIG. 4 is a block diagram of an exemplary configuration of the write control unit 125. The write control unit 125 includes the write control units 126 (126K, 126M, 126C, and 126Y), input-image control units 127 (127K, 127M, 127C, and 127Y), and line memories 128 (128K, 128M, 128C, and 128Y).

The write control unit 126K for K, which is the reference color, includes a write-image processing unit 131K, a misalignment-correction-pattern creating unit 132K, and an LD-data output unit 133K. Each of the write control units 126M, 126C, and 126Y for M, C, and Y, which are the colors other than the reference color, has a similar configuration to that of the write control unit 126K. The write control unit 126 (126M, 126C, 126Y) includes a write-image processing unit 131 (131M, 131C, 131Y), a misalignment-correction-pattern creating unit 132 (132M, 132C, 132Y), and an LD-data output unit 133 (133M, 133C, 133Y). However, the write control units 126M, 126C, and 126Y additionally include skew-correction processing units 135M, 135C, and 135Y, respectively.

Note that in FIG. 4, sets of the main-scanning gate signal (K,M,C,Y)_IPLGATE_N, the sub-scanning gate signal (K,M,C,Y)_IPFGATE_N, and the image data (K,M,C,Y)_IPDATA_N described above with reference to FIG. 3 are collectively denoted as a write control signal (K,M,C,Y)_IPDATA[7:0]_N for clarity of description.

The input-image control unit 127 receives the write control signal (K,M,C,Y)_IPDATA[7:0]_N from the image processing unit 124. The input-image control unit 127 divides the write control signal (K,M,C,Y)_IPDATA[7:0]_N in the sub-scanning direction in such a manner that image data (image) is divided into a plurality of groups each of which includes at least one line in the main-scanning direction (hereinafter, "main-scanning line"). The main-scanning lines are stored in the line memory 128. The input-image control unit 127 transfers the main-scanning lines line-by-line to the write control unit 126 while causing the line memory 128 to be toggled.

In the first embodiment, the input-image control units 127 (127K, 127M, 127C, and 127Y) store the write control signals (K,M,C,Y)_IPDATA[7:0]_N in the line memories 128 (128K, 128M, 128C, 128Y) based on the number of distorted lines that is calculated by the CPU 122. The input-image control units 127 (127K, 127M, 127C, and 127Y) receive the 1-bit binary image data (the write control signal (K,M,C,Y)_IPDATA[7:0]_N) from the image processing unit 124, and transfer the 1-bit binary image data to the write control units 126 (126K, 126M, 126C, and 126Y). Note that the image data transferred to the write control units 126 is not limited to such 1-bit binary image data. For example, binary image data can be converted into 4-bit image data that represents image with density values ranging from 0 (for white pixel) to 15 (for black pixel) that is then transferred to the write control units 126 (126K, 126M, 126C, and 126Y).

The line memories 128K, 128M, 128C, and 128Y receive the write control signal (K,M,C,Y)_IPDATA[7:0]_N from the image processing unit 124 and sequentially store the write control signals therein.

The write-image processing units 131K, 131M, 131C, and 131Y receive the write control signals (K,M,C,Y)_IPDATA [7:0]_N transferred from the input-image control units 127K, 127M, 127C, and 127Y (or the skew-correction processing units 135M, 135C, and 135Y, which will be described later), perform various write-control image processing of the write control signals, and transfer the processed write control signals to the LD-data output units 133K, 133M, 133C, and 133Y.

The misalignment-correction-pattern creating units 132K, 132M, 132C, and 132Y create the correction patterns 14 that are to be transferred onto the transfer belt 3. The misalignment correction amounts for use in correction of color-to-color misalignment on the transfer belt 3 are calculated by using the correction patterns 14.

The LD-data output units 133 (133K, 133M, 133C, and 133Y) convert the write control signals (K,M,C,Y)_IPDATA [7:0]_N transferred from the write-image processing units 131 (131K, 131M, 131C, and 131Y) into the LD light-emission data (K,M,C,Y)_LDDATA. The LD-data output units 133 (133K, 133M, 133C, and 133Y) transmit correction-related data (LDDATA) to the LD control units 114 (114K, 114M, 114C, and 114Y). The correction-related data is created on the main-scanning direction misregistration amounts and the sub-scanning direction misregistration amounts calculated by the CPU 122 for correction of improper write-start timing of laser beam emission. The LD-data output units 133 (133K, 133M, 133C, and 133Y) also transmit data (LDDATA) for adjusting image frequency to the LD control units 114 (114K, 114M, 114C, and 114Y). This data is created based on the main-scanning-direction magnification error amounts calculated by the CPU 122 for correction of magnification error in the main-scanning direction. The LD-data output units 133 (133K, 133M, 133C, and 133Y) further transmit data (LDDATA) for forming the correction patterns 14 generated by the misalignment-correction-pattern creating units 132 (132K, 132M, 132C, and 132Y) on the transfer belt 3 to the LD control units 114 (114K, 114M, 114C, and 114Y). This data is created based on the main-scanning-direction magnification error amounts calculated by the CPU 122 for correction of magnification error in the main-scanning direction.

The LD-data output unit 133 of each color includes a device, such as a clock generator that uses a voltage controlled oscillator (VCO), capable of setting a frequency finely. The LD-data output unit 133 periodically forms (outputs) an image based on the image data (the write control signal (K,M,C,Y)_IPDATA[7:0]_N) of each color on the transfer belt 3 according to a preset output frequency of the clock generator.

The skew-correction processing units 135M, 135C, and 135Y perform skew correction of the write control signals (M,C,Y)_IPDATA[7:0]_N based on the reference color, K. Specifically, the skew-correction processing unit 135 divides pixels that belong to one main-scanning line of the image data stored in the line memory 128 into pixel blocks, shifts image data of one of the pixel blocks in the sub-scanning direction against a direction of skew, and transfers the image data to the write-image processing unit 131. Hence, the skew that can otherwise occur during the process of forming a toner image can be corrected. How the write control unit 126 performs an image writing process will be described in detail.

A process for writing a K-image will be described with reference to FIG. 4. The image processing unit 124 transmits image data K_IPDATA[7:0]_N to the input-image control unit 127K. The input-image control unit 127K transmits the image data to the input-image control unit 127K while temporarily storing the image data in the line memory 128K. In the write control unit 126K, the write-image processing unit 131K receives the image data from the input-image control unit 127K and transmits the image data to the LD-data output unit 133K. Based on the image data, the LD-data output unit 133K generates the light-emission data K_LDDATA for K and transmits the generated data to the LD control unit 114K.

A process for writing M-, C-, and Y-images will be described with reference to FIG. 4. The image processing unit 124 transmits image data (M,C,Y)_IPDATA[7:0]_N to the input-image control units 127M, 127C, and 127Y. The input-image control units 127M, 127C, and 127Y temporarily store the image data in the line memories 128M, 128C, and 128Y to perform skew correction according to skew correction amounts stored in the RAM 123. The skew-correction processing units 135M, 135C, and 135Y correct skew of the temporarily-stored image data according to the skew correction amounts, and transmits the corrected image data to the write-image processing units 131M, 131C, and 131Y, respectively. As in the case of the process for K, the LD-data output units 133M, 133C, and 133Y receive the image data from the write-image processing units 131M, 131C, and 131Y, generate the light-emission data (M,C,Y)_LDDATA, and transmits the generated light-emission data (M,C,Y)_LDDATA to the LD control units 114M, 114C, and 114Y, respectively. The skew correction amounts will be described below.

Meanwhile, the correction patterns 14 are formed in a manner similar to that described above; however, the correction patterns 14 are formed based on pattern image data for K-, M-, C-, and Y-correction patterns that are transmitted from the misalignment-correction-pattern creating units 132K, 132M, 132C, and 132Y and received by the LD-data output units 133K, 133M, 133C, and 133Y.

Figure 5:
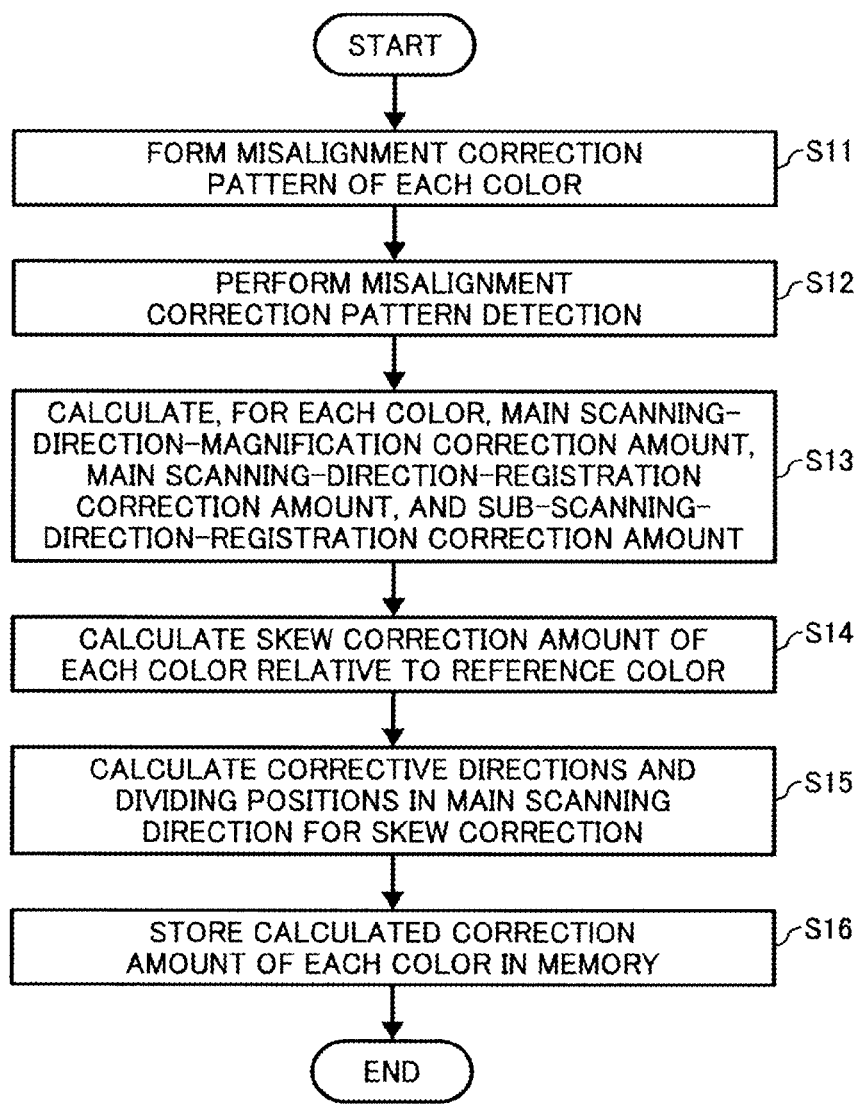
FIG. 5 is a flowchart for explaining correction of color misalignment.

As described above, occurrence of color misalignment is a critical problem when forming a full-color image by superimposing K-, M-, C-, and Y-toner images on one another. A process of correcting color misalignment will be described with reference to FIG. 5. FIG. 5 is a flowchart for explaining correction of the color misalignment. The misalignment correction will be described below on an assumption that the reference color is K. The reference color functions as a reference in color misalignment correction. Color-to-color misalignment is corrected by adjusting the other colors to the reference color.

When the write control unit 125 is commanded to start misalignment correction by the CPU 122, the write control unit 125 forms the correction patterns 14 on the transfer belt 3 (Step S11). The correction patterns 14 are created by the misalignment-correction-pattern creating units 132K, 132M, 132C, and 132Y in the write control units 126K, 126M, 126C, and 126Y depicted in FIG. 4. The detection sensors 15 and 16 detect positions of the correction patterns 14, and output detection signals that indicate the positions of the correction patterns 14 to the pattern detecting unit 121 (Step S12).

The pattern detecting unit 121 receives the detection signals, converts them into digital data. The CPU 122 calculates a main-scanning-direction-magnification correction amount, a main-scanning-direction-registration correction amount, and a sub-scanning-direction-registration correction amount of each color relative to the reference color (K) based on the positions of the correction patterns 14 according to the digital data (Step S13). The CPU 122 also calculates a skew correction amount of each color relative to the reference color (K) (Step S14). The CPU 122 then calculates correcting directions and dividing positions in the main-scanning direction for skew correction (Step S15).

The CPU 122 stores information that includes information about the main-scanning-direction magnification correction amounts, the main-scanning-direction registration correction amount, the sub-scanning-direction registration correction amount, the skew correction amounts, and the correcting directions and the dividing positions in the main-scanning direction for skew correction in the RAM 123 (or in a nonvolatile memory) (Step S16). Then, the process control ends. The correction amounts stored in the RAM 123 will be used as correction amounts for use in printing before completion of this procedure that would be performed to correct misalignment that occurs next time.

Figure 6:
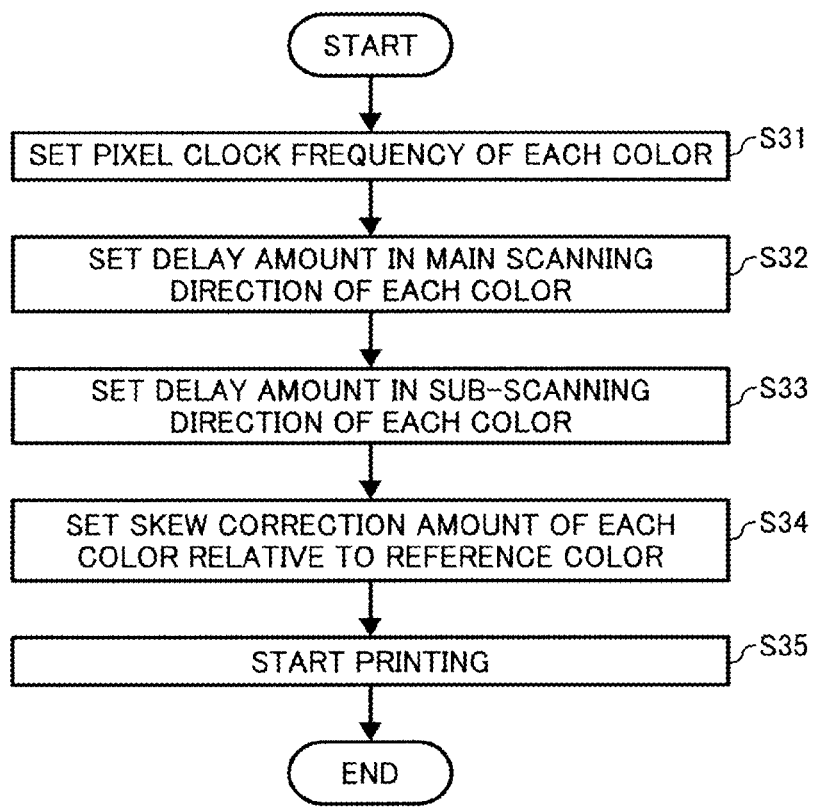
FIG. 6 is a flowchart of an exemplary method for printing implemented by the color copier depicted in FIG. 1.

After the main-scanning-direction magnification correction amounts, the main-scanning-direction registration correction amounts, the sub-scanning-direction registration correction amounts, the skew correction amounts, and the correcting directions in the main-scanning direction and the dividing positions for skew correction of each color of M, C, and Y have been stored in the RAM 123 (or in the nonvolatile memory) as described above, a printing process is performed. FIG. 6 is a flowchart for explaining how printing is performed.

Upon receiving a print request from the CPU 122, the write control unit 125 sets a pixel clock frequency for each color of K, M, C, and Y based on the main-scanning-direction magnification correction amounts (Step S31). The write control unit 125 sets a delay amount in the main-scanning direction of each color (Step S32), and sets a delay amount in the sub-scanning direction of each color (Step S33).

The write control unit 125 sets a skew correction amount of each color of M, C, and Y relative to the reference color (K) based on the skew correction amount and information about the number of levels of each color (Step S34). The write control unit 125 starts printing while performing image correction for each color of K, M, C, and Y based on the set pixel clock frequencies, the delay amounts in the main-scanning direction, and the delay amount in the sub-scanning direction, and the skew correction amounts (Step S35). Then, the process control ends.

The main-scanning-direction misalignment is corrected by correcting the main-scanning-direction magnification and write-start timing in the main-scanning direction. The main-scanning-direction magnification error can be corrected by adjusting a picture frequency based on the main-scanning-direction magnification correction amount of each color calculated by the write control unit 125. The write control unit 125 includes a device, such as a clock generator that uses a voltage controlled oscillator (VCO), capable of setting a frequency finely. A counter in the main-scanning direction is triggered by a synchronization detection signal of each color. The write-start timing in the main-scanning direction is adjusted depending on a position on an output of the counter at which the LD starts output of data.

Figure 7:
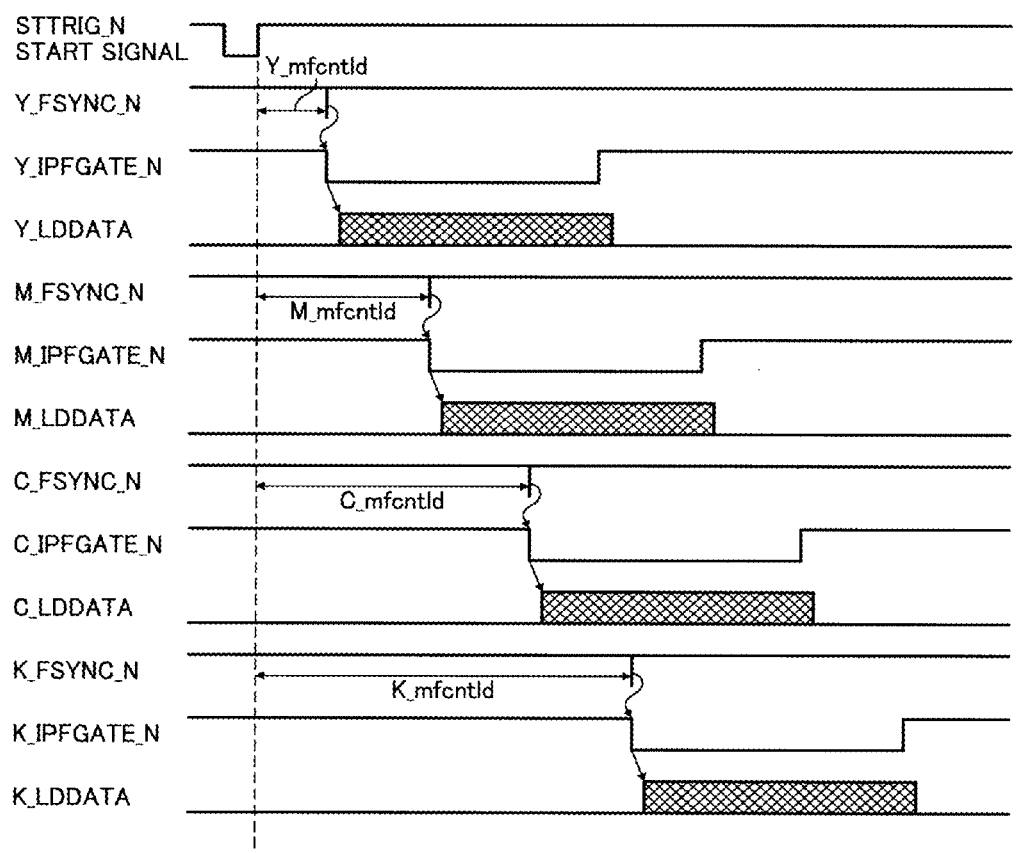
FIG. 7 is a timing chart for explaining write timing correction in the sub-scanning direction performed by the write control unit depicted in FIG. 4.

The sub-scanning-direction misalignment is corrected by adjusting write-start timing in the sub-scanning direction. FIG. 7 is a timing chart for explaining write timing correction in the sub-scanning direction performed by the write control unit 125. The write control unit 125 counts the number of lines in response to a start signal STTRIG_N that serves as a reference and outputs a sub-scanning timing signal (Y,M,C,K)_FSYNC_N to the image processing unit 124.

The sub-scanning timing signal (Y,M,C,K)_FSYNC_N triggers the image processing unit 124 to output the sub-scanning timing signal (Y,M,C,K)_FSYNC_N to the write control unit 125 and transfer the image data K_IPDATA[7:0]_N to the write control unit 125. The write control units 126K, 126M, 126C, and 126Y transmit the LD light-emission data (K,M,C,Y)_LDDATA to the LD control units 114K, 114M, 114C, and 114Y.

The sub-scanning-direction misregistration is corrected by adjusting sub-scanning delay amounts (Y,M,C,K)_mfcntld relative to the start signal according to the calculated misregistration amounts. It is general to perform alignment in the sub-scanning direction by adjusting timings (Y,M,C,K)_mfcntld while taking the sub-scanning delay amount of each color (M, C, and Y) relative to the reference color K into consideration.

How the color copier 60 calculates the misalignment amounts and corrects the misalignment will be described below. The detection sensors 15 and 16 detect the positions of the correction patterns 14 and output detection signals. The pattern detecting unit 121 converts the detection signals from analog data into digital data, which then undergoes sampling. The sampled digital data is stored in the RAM 123. After the procedure related to the detection of the correction patterns 14 is completed, the CPU 122 performs computations for calculations of the various misalignment amounts (the main-scanning-direction-magnification error amounts, the main-scanning direction misregistration amounts, the sub-scanning direction misregistration amounts, and the skew amounts). The CPU then calculates the correction amounts (the main-scanning-direction-magnification correction amounts, the main-scanning direction correction amounts, the sub-scanning direction correction amounts, and the skew correction amounts) of the misalignment components from the misalignment amounts.

Figure 8:
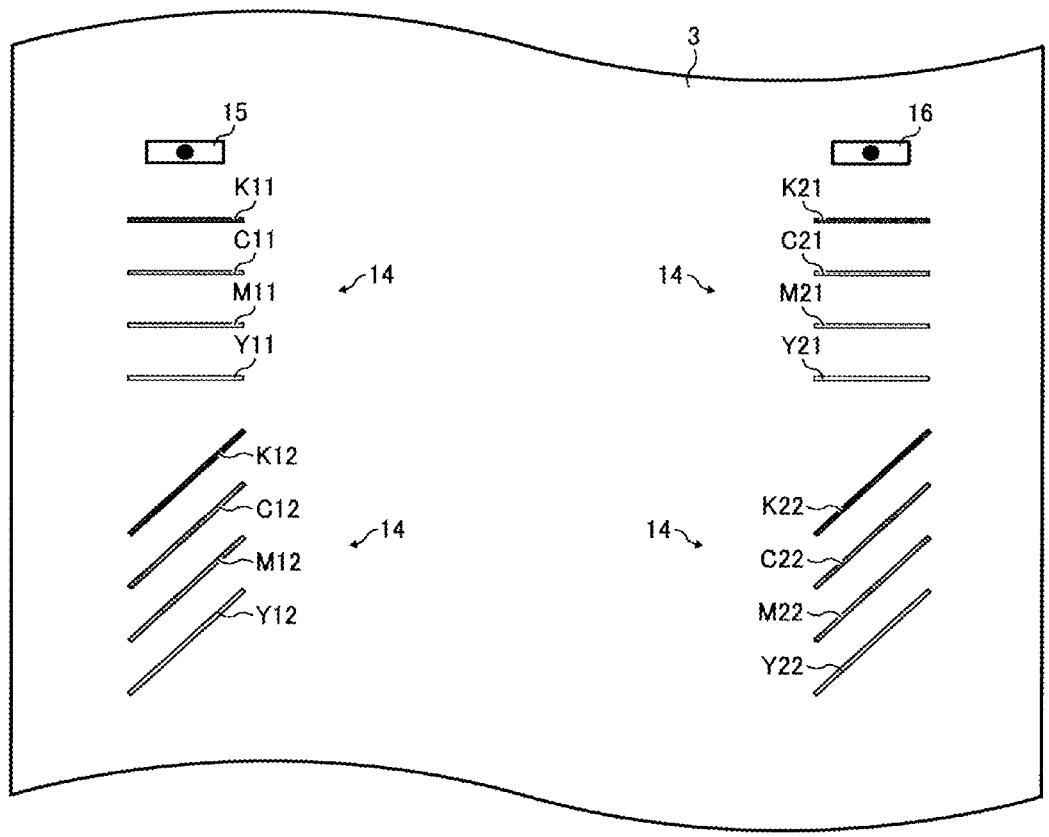
FIG. 8 is a schematic diagram of exemplary correction patterns formed on the transfer belt depicted in FIG. 2.
Figure 9:
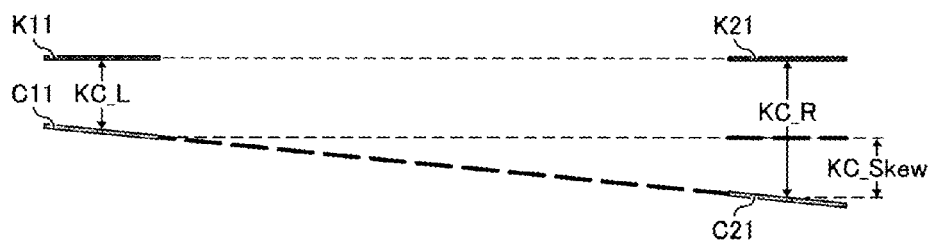
FIG. 9 is a schematic diagram for explaining a method of calculating a skew amount.

How to calculate the skew amounts and the skew correction amounts for use in the skew correction will be described. FIG. 8 is a schematic diagram of exemplary correction patterns formed on the transfer belt 3. FIG. 9 is a schematic diagram for explaining a method of calculating a skew amount. FIG. 9 depicts an example of the method of calculating a skew amount of each color by using K as the reference color.

The CPU 122 calculates a skew amount of each color (M, C, Y) relative to the reference color K. A state in which, as depicted in FIG. 9, right sections of C-correction patterns (C11 and C21) of the correction patterns 14 are shifted downward as compared to those in a normal state will be described as an example. The detection sensor 15 on the left side in FIG. 9 detects positions of some (K11 and C11) of left sections of the correction patterns 14 and calculates KC_L, which is a distance between the left section of the K-correction pattern and that of the C-correction pattern based on a relationship between the detected positions. The detection sensor 16 on the right side in FIG. 9 detects positions of some (K21 and C21) of right sections of the correction patterns 14 and calculates KC_R, which is a distance between the right section of the K-correction pattern and that of the C-correction pattern based on a relationship between the detected positions. Hence, KC_Skew, which is a C-skew amount relative to K, is calculated by using Equation (1):

$$KC\_Skew = KC\_R - KC\_L \tag{1}$$

KM_Skew, which is an M-skew amount relative to K, and KY_Skew, which is a Y-skew amount relative to K, can be similarly calculated by detecting the positions of the correction patterns 14 and by using Equations (2) and (3), respectively:

$$KM\_Skew = KM\_R - KM\_L \tag{2}$$

$$KY\_Skew = KY\_R - KY\_L \tag{3}$$

KC_Skew, which is the C-skew amount, KM_Skew, which is the M-skew amount, and KY_Skew, which is the Y-skew amount, relative to K can be calculated as described above.

Calculation of a skew correction amount based on the skew amounts will be described below in detail by way of an example. FIG. 10 is a table of exemplary skew amounts relative to the reference color K for a resolution of 600 dots per inch (dpi) in the sub-scanning direction. It is assumed that the skew amount of each color is calculated as depicted in FIG. 10 by using Equations (1) to (3). More specifically, it is assumed that the skew amount of each color are such that the M-skew amount is −110 micromillimeters, the C-skew amount is −130 micromillimeters, and the Y-skew amount is 30 micromillimeters. Because the resolution in the sub-scanning direction is 600 dpi, shifting by one line corresponds in distance to a displacement of 42.3 micromillimeters that is obtained by dividing 25400 micromillimeters by 600. Hence, the screw correction amount can be calculated by dividing the skew amount of each color by the displacement distance for one-line shifting, rounding off the quotient to the number of decimal, and inverting the sign of the value. FIG. 11 is a table of exemplary skew correction amounts obtained from the skew amounts of FIG. 10. As depicted in FIG. 11, the M-skew correction amount is +3 lines, the C-skew correction amount is +3 lines, and the Y-skew correction amount is −1 line.

An example of the skew correction method (method of calculating the skew correction amounts) will be described with reference to FIGS. 12 to 17. FIG. 12 is a schematic diagram of an input image of eight lines of image data. One line of the image data corresponds to image data stored in a single line memory. FIG. 13 is a schematic diagram of an output image that is obtained by outputting image data of the input image depicted in FIG. 12 as LD light-emission data without performing the skew correction. When the image data is output as the LD light-emission data without being subjected to the skew correction as in this example, skew of a scanning beam causes a right side of an output image on a sheet to be deviated upward by three lines as compared to the input image depicted in FIG. 12. In other words, the skew correction amount for the image depicted in FIG. 13 is three lines.

When, as in this case, a right side of an output image is deviated upward by three lines, pixels belonging to one line of the image data in the main-scanning direction are divided into {(the number of lines of the skew correction amount)+1} equal blocks. More specifically, in this example, 4800 pixels are divided into four equal blocks as depicted in FIG. 14. Each of the positions (dividing position) where the pixels on the line in the main scanning direction are divided is denoted as a "shift position", and each of regions that are defined by dividing at the shift positions on the line in the main-scanning direction is denoted as a shift region.

As depicted in FIG. 15, the skew-correction processing units 135 (135M, 135C, and 135Y) causes the pixels divided at the shift positions to shift such that a shift region is shifted downward by one line than a left-neighboring shift region for each of the shift regions. This downward shift is performed in order to compensate for the skew in the sub-scanning direction. In this manner, the skew-correction processing units 135 (135M, 135C, and 135Y) correct the skew of the output image on the sheet as depicted in FIG. 16.

More specifically, a portion of the image data is stored in each of the line memories 128M, 128C, and 128Y in a sequential manner. That portion of the image data is read out from the line memory 128 for each of the shift regions defined by the dividing at the shift positions. By selectively changing the line memory 128, it is possible to obtain the output image depicted in FIG. 16.

Hence, as depicted in FIG. 17, the skew-correction processing unit 135 calculates shift positions and shift directions (+ve or −ve) in the sub-scanning direction at the shift positions based on the skew correction amounts calculated by the CPU 122. The shift position is an address of the corresponding line memory. The shift positions and the shift directions are referred to as shift correction information. The skew-correction processing unit 135 causes the pixels (shift regions) divided in the main-scanning direction at the shift positions to shift in the shift directions, thereby performing color-to-color skew correction. FIG. 17 is a table of exemplary shift positions and shift directions calculated by the skew-correction processing unit 135.

Another example of the skew correction method performed by the skew-correction processing unit 135 will be described with reference to FIGS. 18 to 23. FIGS. 18 to 23 are schematic diagrams for explaining the other example of the skew correction method. FIG. 18 is a schematic diagram depicting eight lines of image data. FIG. 19 is an output image that is obtained by outputting image data pertaining to an input image depicted in FIG. 18 as LD light-emission data without performing the skew correction. When the image data is output as the LD light-emission data without being subjected to the skew correction, skew of a scanning beam causes a right side of an output image on a sheet to be shifted downward by one line as compared with the input image depicted in FIG. 18. In other words, the skew correction amount is one line. This skew can also be corrected by performing similar operations as described above with reference to FIGS. 12 to 17.

More specifically, when a right side of an output of image data is undesirably deviated downward by one line, the skew-correction processing units 135M, 135C, and 135Y divide 4800 pixels that belong to one line of the image data in the main-scanning direction into equal blocks. More specifically, the skew-correction processing unit 135 divides the pixels into {(the number of lines of the skew correction amount)+1} equal blocks. It is assumed that the pixels are divided into two equal blocks as depicted in FIG. 20. As depicted in FIG. 21, the skew-correction processing units 135M, 135C, and 135Y cause the pixels divided at the shift position to shift such that a shift region is shifted upward by one line than a left-neighboring shift region for each of the shift regions. In this manner, the skew-correction processing units 135M, 135C, and 135Y correct the skew of the output image on the sheet as depicted in FIG. 22.

More specifically, a portion of the image data is stored in each of the line memories 128M, 128C, and 128Y in a sequential manner. That portion of the image data is read out from the line memory 128 for each of the shift regions defined by the dividing at the shift positions. By selectively changing the line memory 128, it is possible to obtain the output image depicted in FIG. 16 or FIG. 22.

Hence, as depicted in FIG. 17 and FIG. 23, the skew-correction processing unit 135 calculates shift position and shift direction (+ve or −ve) in the sub-scanning direction at the shift positions based on the skew correction amounts calculated by the CPU 122. The shift position is an address of the corresponding line memory. The shift positions and the shift directions are referred to as shift correction information. The skew-correction processing unit 135 causes the pixels (shift region) divided in the main-scanning direction at the shift position to shift in the shift directions, thereby performing color-to-color skew correction. Information including the address of the shift position in the main-scanning direction and the shift direction (+ve or −ve) in the sub-scanning direction at the shift position is denoted as shift correction information.

The shift correction information is stored in the RAM 123. The shift correction information is obtained based on the skew correction amounts calculated by the CPU 122. The skew-correction processing unit 135 retrieves the shift correction information from the RAM 123 for each skew correction and performs the skew correction based on the shift correction information. The skew-correction processing unit 135 updates the shift correction information when a new piece of the shift correction information is obtained.

Assume that, for example, image data represents 4800 pixels in the main-scanning direction as depicted in FIG. 14. Because the pixels on the right end are deviated upward by three lines relative to the pixels on the left end, the skew-correction processing unit 135 divides the 4800 pixels that belong to one line of image data in the main-scanning direction into four equal blocks. More specifically, the skew-correction processing unit 135 divides the pixels into a shift region of the 1st to 1200th pixels, that of the 1201st to 2400th pixels, that of the 2401st to 3600th pixels, and that of the 3601st to 4800th pixels, these shift regions are denoted as a first block, a second block, a third block, and a fourth block, respectively.

The numbers 1 to 8 in FIG. 14 indicate the ordinal numbers of the eight lines. As depicted in FIG. 15, for the 1st to 1200th pixels of the first line, the skew-correction processing unit 135 outputs the first block of the image data in the line memory for the first line and outputs white pixels for the 1201st to 4800th pixels. For the 1st to 1200th pixels of the second line, the skew-correction processing unit 135 outputs the first block of the image data in the line memory for the second line. For the 1201st to 2400th pixels of the second line, the skew-correction processing unit 135 outputs the second block of the image data in the line memory for the first line, and outputs white pixels for the 2401st to 4800th pixels of the second line. By repeating an image-data output process in this manner, the skew-correction processing unit 135 corrects the skew of an output image on a sheet as depicted in FIG. 16.

Figure 24:
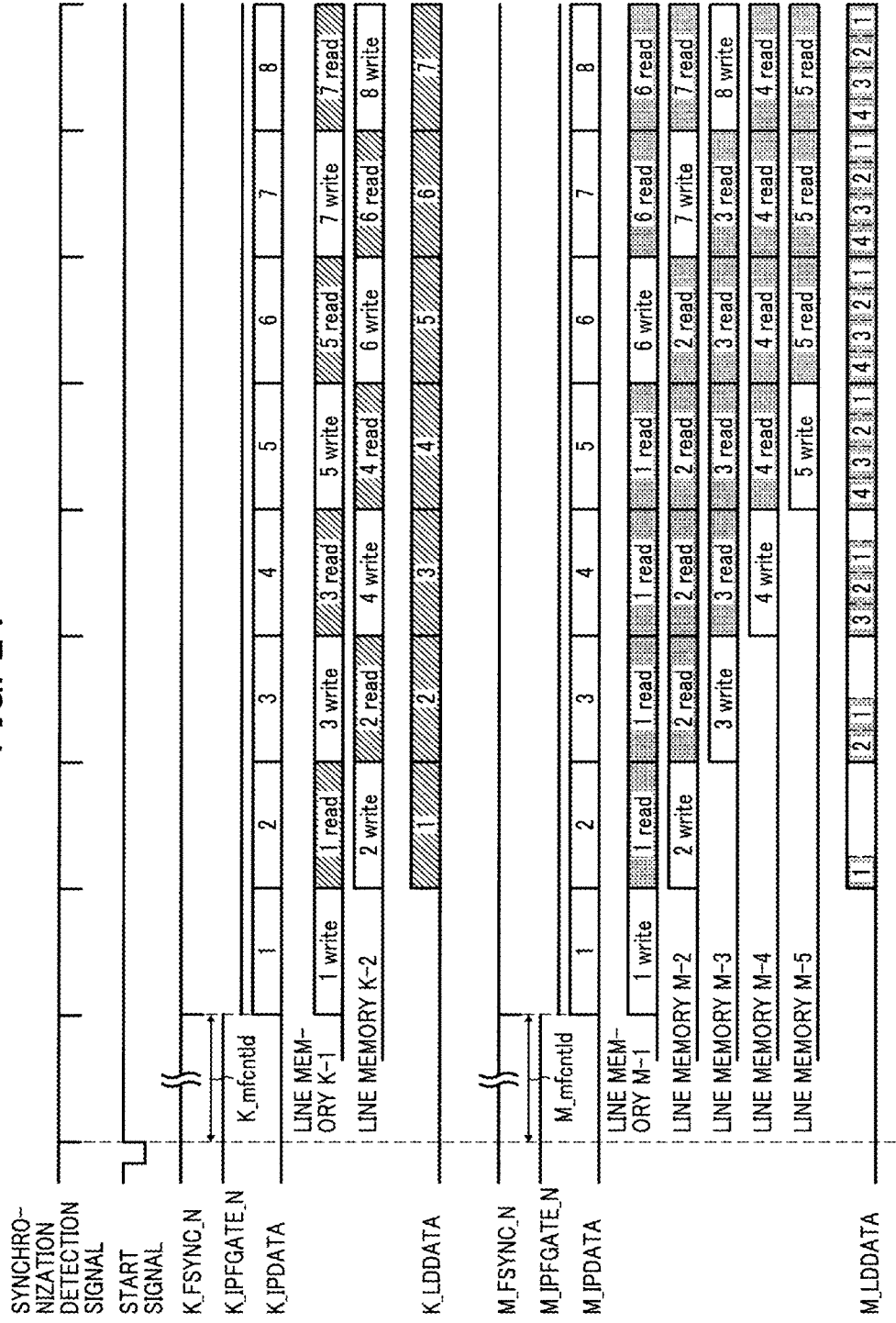
FIGS. 24 and 25 depict a timing chart of read/write timings for reading and writing in the sub-scanning direction performed by the write control unit depicted in FIG. 4 during skew correction.
Figure 25:
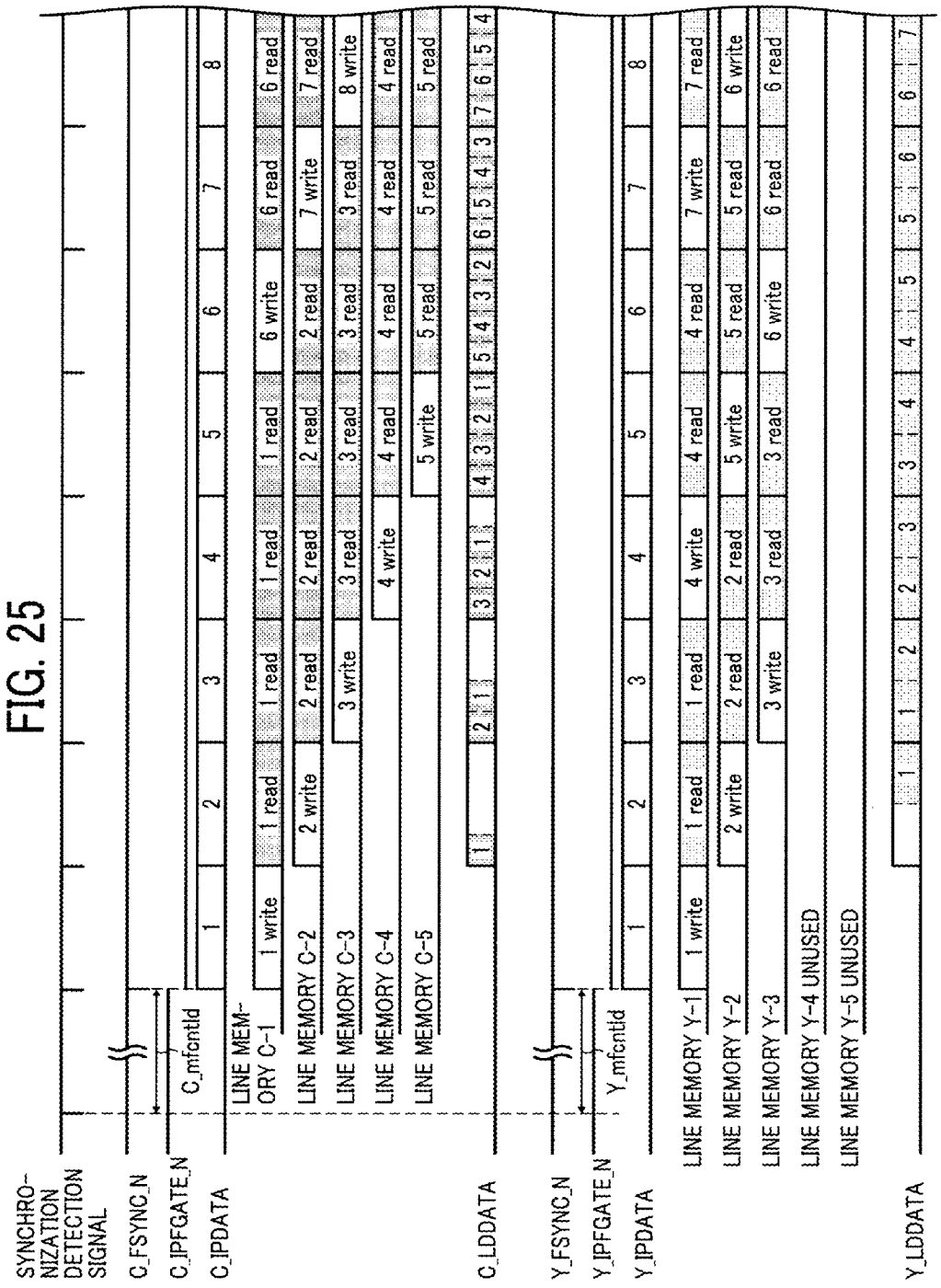

FIGS. 24 and 25 are timing charts of read/write timings for reading and writing performed by the write control unit 125 in the sub-scanning direction. It is assumed that because K is the reference color, dividing for the K-image is not performed. A skew correction amount for each of M and C is three dots (lines), and a skew correction amount for Y is one dot (line). Accordingly, for each of M and C, three shift regions of equally-divided four shift regions are shifted in the shift direction, while for Y, one shift region of equally-divided two shift regions is shifted in the shift direction.

The input-image control unit 127 starts a printing operation after a sub-scanning delay (K,M,C,Y)_mfcntld from the start signal STTRIG_N. When printing is started, the input-image control unit 127 stores image data in line memories K-1, M-1, C-1, and Y-1.

Subsequently, the input-image control unit 127 stores image data in line memories K-2, M-2, C-2, and Y-2, and simultaneously reads from the line memories K-1, M-1, C-1, and Y-1 the image data stored therein. The write control unit 126K causes all pixels of the line memory K-1 to be output to the K-LD light-emission data K_LDDATA. The write control unit 126M causes pixels of the first block of the equally-divided four shift regions of the line memory M-1 to be output to M-LD light-emission data M_LDDATA. The write control unit 126C causes pixels of the first block of the equally-divided four shift regions of the line memory C-1 to be output to C-LD light-emission data C_LDDATA. The write control unit 126Y causes pixels of the first block of the equally-divided two shift regions of the line memory Y-1 to be output to Y-LD light-emission data Y_LDDATA.

The input-image control units 127K, 127M, 127C, and 127Y store image data in line memories K-3, M-3, C-3, and Y-3, and simultaneously reads from the line memories K-2, M-1, M-2, C-1, C-2, Y-1, and Y-2 the image data stored therein. The write control unit 126K causes all pixels of the line memory K-2 to be output to the K-LD light-emission data K_LDDATA. The write control unit 126M causes pixels of the second block of the line memory M-1 and pixels of the first block of the line memory M-2 to be output to the M-LD light-emission data M_LDDATA. The write control unit 126C causes pixels of the second block of the line memory C-1 and pixels of the first block of the line memory C-2 to be output to the C-LD light-emission data C_LDDATA. The write control unit 126Y causes pixels of the second block of the line memory Y-1 and pixels of the first block of the line memory Y-2 to be output to the Y-LD light-emission data Y_LDDATA.

The input-image control units 127K, 127M, 127C, and 127Y store image data in line memories K-4, M-4, C-4, and Y-1, and simultaneously reads from the line memories K-1, M-1, M-2, M-3, C-1, C-2, C-3, Y-2, and Y-3 the image data stored therein. The write control unit 126K causes all pixels of the line memory K-3 to be output to the K-LD light-emission data K_LDDATA. The write control unit 126M causes pixels of the third block of the line memory M-1, pixels of the second block of the line memory M-2, and pixels of the first block of the line memory M-3 to be output to the M-LD light-emission data M_LDDATA. The write control unit 126C causes pixels of the third block of the line memory C-1, pixels of the second block of the line memory C-2, and pixels of the first block of the line memory C-3 to be output to the C-LD light-emission data C_LDDATA. The write control unit 126Y causes pixels of the second block of the line memory Y-2 and pixels of the first block of the line memory Y-3 to be output to the Y-LD light-emission data Y_LDDATA.

The input-image control units 127K, 127M, 127C, and 127Y store image data in line memories K-5, M-5, C-5, and Y-2, and simultaneously reads from the line memories K-2, M-1, M-2, M-3, M-4, C-1, C-2, C-3, C-4, Y-1, and Y-3 the image data stored therein. The write control unit 126K causes all pixels of the line memory K-4 to be output to the K-LD light-emission data K_LDDATA. The write control unit 126M causes pixels of the fourth block of the line memory M-1, pixels of the third block of the line memory M-2, pixels of the second block of the line memory M-3, and pixels of the first block of the line memory M-4 to be output to the M-LD light-emission data M_LDDATA. The write control unit 126C causes pixels of the fourth block of the line memory C-1, pixels of the third block of the line memory C-2, pixels of the second block of the line memory C-3, and pixels of the first block of the line memory C-4 to be output to the C-LD light-emission data C_LDDATA. The write control unit 126Y causes pixels of the second block of the line memory Y-3 and pixels of the first block of the line memory Y-4 to be output to the Y-LD light-emission data Y_LDDATA. The above procedure is repeatedly performed, and printing of the skew-corrected image data is performed.

In the skew correction described above, the pixels that belong to one line of image data in the main-scanning direction are divided into a plurality of blocks. Dividing one line of image data in a plurality of blocks, however, can change relationship between adjacent pixels on each of the shift positions leading to a local color density change at the shift position, i.e., density shift. This density shift is particularly noticeable in an image processed by a digital halftoning method such as dither. Because local color density change occurs at a shift position in a dithered image at regular intervals in the sub-scanning direction, density shift is particularly noticeable in the dithered image.

Why performing the skew correction on a dithered image data can result in density shift will be described below. A color MFP such as a color laser printer includes different dither matrices for smooth tone transition. The dither matrices differ from one another for different colors, for each of a photo mode and a character mode, for different classes of the number of bits, for different levels of resolutions, and the like. The dither matrices differ from one another in size and shape in many cases.

Dithering is a method of converting a multi-level image into a binary image. This binarization is performed by applying a matrix, what is called dither matrix, of threshold values of N×M pixels (both N and M are positive integers) to an original, multi-level image. Each pixel (dither matrix size) is so small that the obtained binary image is perceived as being a gray-level image. Thus, dithering is a technique of simulating multiple tones by using binary values. A multi-level dither method of obtaining a multi-level image by setting the number of levels of resultant dithered images to 3 to 16 rather than 2 can also be used. A binary image will be described below as an example; however, the present invention is applicable to multiple-level images as well.

In electrophotographic recording, because the diameter of a laser beam is greater than the size of a pixel, a toner area coverage of each pixel is greater than the size of the pixel on an actually recorded image (toner image on printing paper). When the shifting for skew correction (hereinafter, "corrective shifting") is performed, an area where toner overlaps (hereinafter, "toner-overlapping area") can increase or decrease at a shift position. Accordingly, a toner area coverage can decrease or increase at the shift position.

For example, in a case where a toner area coverage increases (i.e., a toner-overlapping area of pixels of image data decreases) by corrective shifting, a local color density on or in the vicinity of a shift position increases. In contrast, in a case where a toner area coverage decreases (i.e., toner-overlapping area of pixels of image data increases) by corrective shifting, a local color density on or in the vicinity of a shift position decreases. Because this change in toner area coverage occurs only at the shift position, an image in the vicinity of the shift position can be degraded by the corrective shifting. In particular, in a digitally-halftoned image such as a dithered image, when the toner area coverage is changed at a number of positions, the corrective shifting can result in banding noise extending in the sub-scanning direction.

Figure 26:
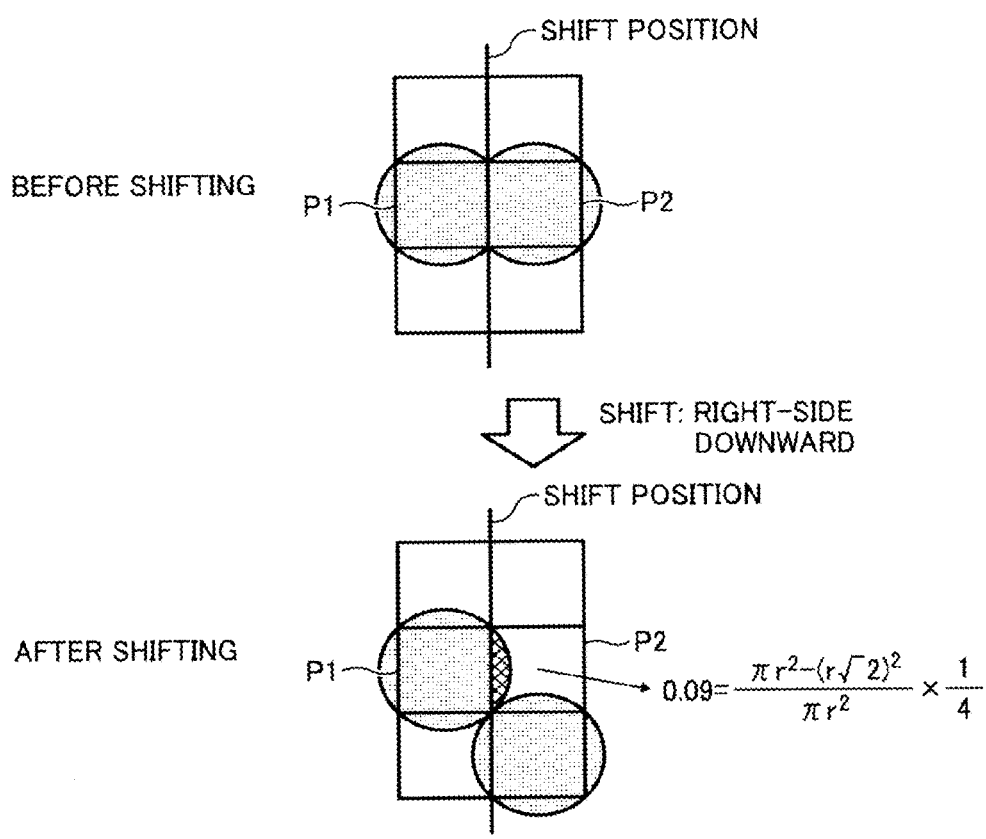
FIG. 26 is a schematic diagram of a pixel of which toner area coverage is changed by corrective shifting.

An exemplary case where corrective shifting results in an increase or decrease of a toner area coverage will be described specifically. FIG. 26 is a schematic explanatory diagram of an example of a pixel of which toner area coverage is changed by corrective shifting.

The corrective shifting in the sub-scanning direction is performed on a line-by-line basis. Accordingly, the corrective shifting causes one of two adjacent pixels, which are adjacent to each other with the shift position therebetween, to be shifted in the sub-scanning direction by one pixel. Hence, relationship between the adjacent pixels with the shift position therebetween can be changed by the corrective shifting in the sub-scanning direction. FIG. 26 depicts that before corrective shifting, both a pixel P1 and its neighboring pixel P2 are black pixels. However, the pixel P2 adjacent to the pixel P1 is changed to a white pixel after the corrective shifting. When such an image in which a pixel adjacent to a certain pixel is changed is output, as depicted in a bottom diagram of FIG. 26 depicting pixels after the corrective shifting, a toner area coverage is changed by an area depicted as a cross-hatched area.

Assume that, for example, the toner area coverage within the pixel P1 is 1. After corrective shifting downward in the sub-scanning direction is performed at the shift position, the pixel P1 and the pixel P2 do not have toner-overlapping area, which has been present before the corrective shifting, therebetween any more. As a result, the toner area coverage increases by 0.09. When such an increase in toner area coverage occurs at regular intervals in the sub-scanning direction on a shift position, black banding noise that degrades image quality can appear on an output image.

In contrast, although not depicted, when a toner-overlapping area is created by corrective shifting, the toner area coverage decreases by 0.09. When such a decrease in the toner coverage area occurs at regular intervals in the sub-scanning direction on a shift position, white banding noise that degrades image quality can appear on an output image.

The corrective shifting can reduce misalignment due to skew or curve; however, the corrective shifting can disadvantageously result in banding noise on an output image of digitally-halftoned image data, in particular. To this end, the skew-correction processing units 135M, 135C, and 135Y of the first embodiment not only perform the corrective shifting but also compensate a change in density resulting from the corrective shifting. The skew-correction processing units 135M, 135C, and 135Y will be described in detail below.

Figure 27:
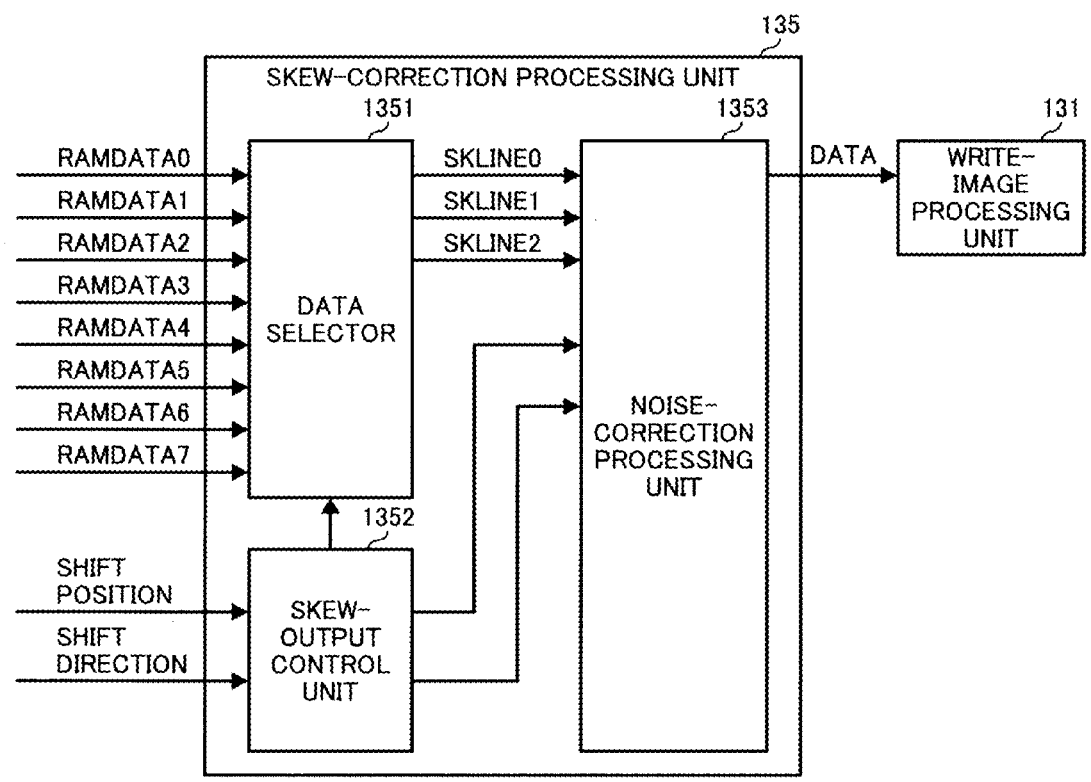
FIG. 27 is a block diagram of a skew-correction processing unit according to the first embodiment.

FIG. 27 is a detailed block diagram of the skew-correction processing unit 135. The skew-correction processing unit 135 can be any one of the skew-correction processing units 135M, 135C, and 135Y. The skew-correction processing unit 135 includes a data selector 1351, a skew-output control unit 1352, and a noise-correction processing unit 1353.

The skew-output control unit 1352 retrieves the shift correction information (information about the shift position and the shift direction) from the RAM 123, and outputs a selection signal for selecting image data to be output based on the shift correction information. The image data to be output is selected from image data stored in the line memory 128M by designating one of the lines of the line memory 128M. The skew-output control unit 1352 outputs the shift correction information to the noise-correction processing unit 1353.

The data selector 1351 selects the image data of the designated line to be output from the image data having been read from the line memory 128M by the input-image control unit 127M based on the selection signal output from the skew-output control unit 1352. The data selector 1351 outputs the selected image data to the noise-correction processing unit 1353. More specifically, in the first embodiment, the data selector 1351 outputs, in addition to the image data of the designated line, image data of the line immediately above the designated line and that of the line immediately below the designated line (image data pertaining to these three lines in total) to the noise-correction processing unit 1353. In the first embodiment, the three lines×two pixels of image data is output to the noise-correction processing unit 1353; however, the image data to be output to the noise-correction processing unit 1353 is not limited thereto. For example, image data corresponding to more than three lines can be output to the noise-correction processing unit 1353 depending on processing performed by the noise-correction processing unit 1353.

The noise-correction processing unit 1353 receives the shift correction information from the skew-output control unit 1352 and the image data from the data selector 1351. The noise-correction processing unit 1353 extracts, from the image data, one or more pixels at a position where noise is determined to occur in the vicinity of the shift position. The noise-correction processing unit 1353 corrects a color density of image data of the extracted pixel to prevent noise, and outputs the color-density-corrected image data to the write-image processing unit 131.

Figure 28:
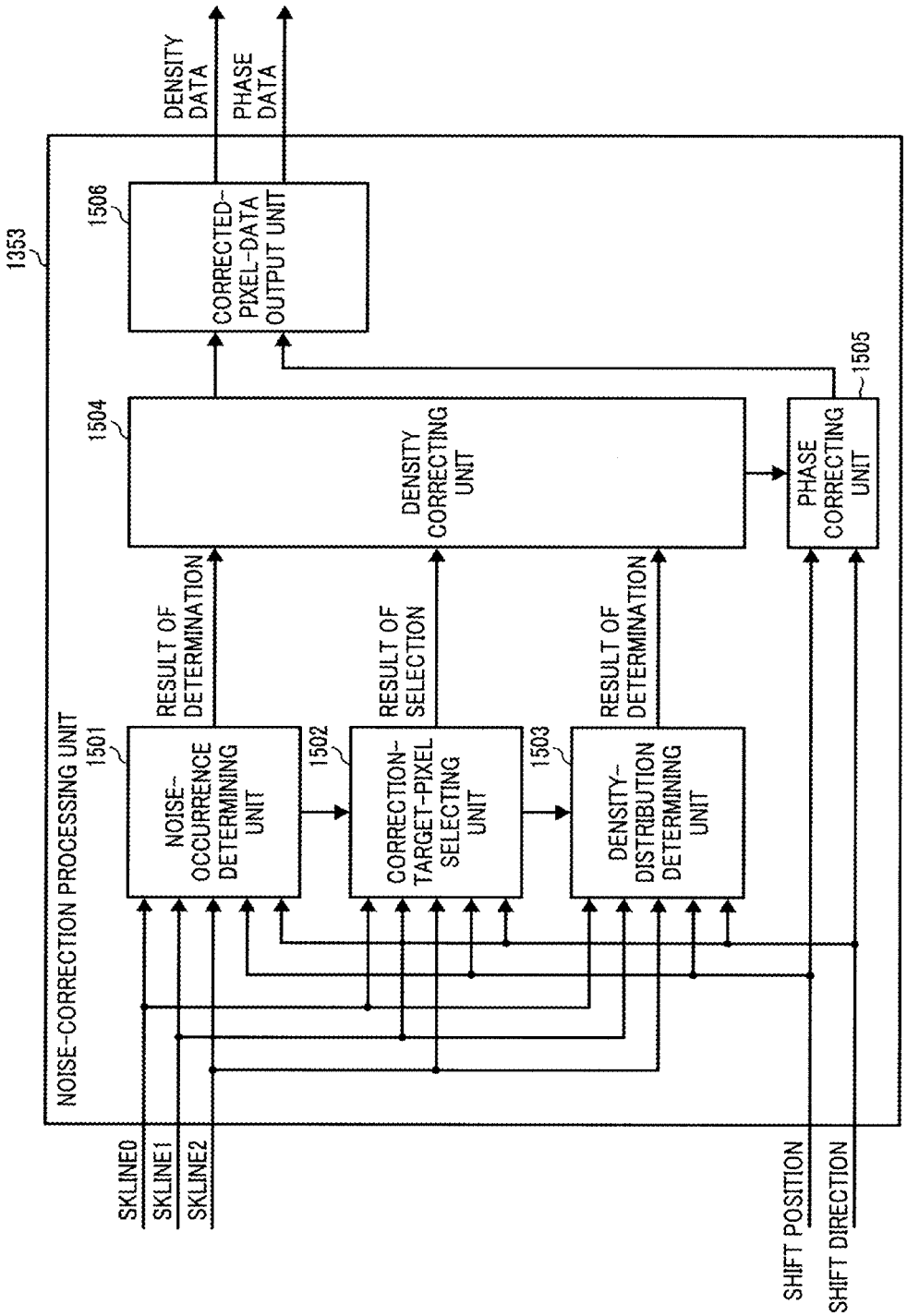
FIG. 28 is a block diagram of a noise-correction processing unit of the skew-correction processing unit depicted in FIG. 27.
Figure 29:
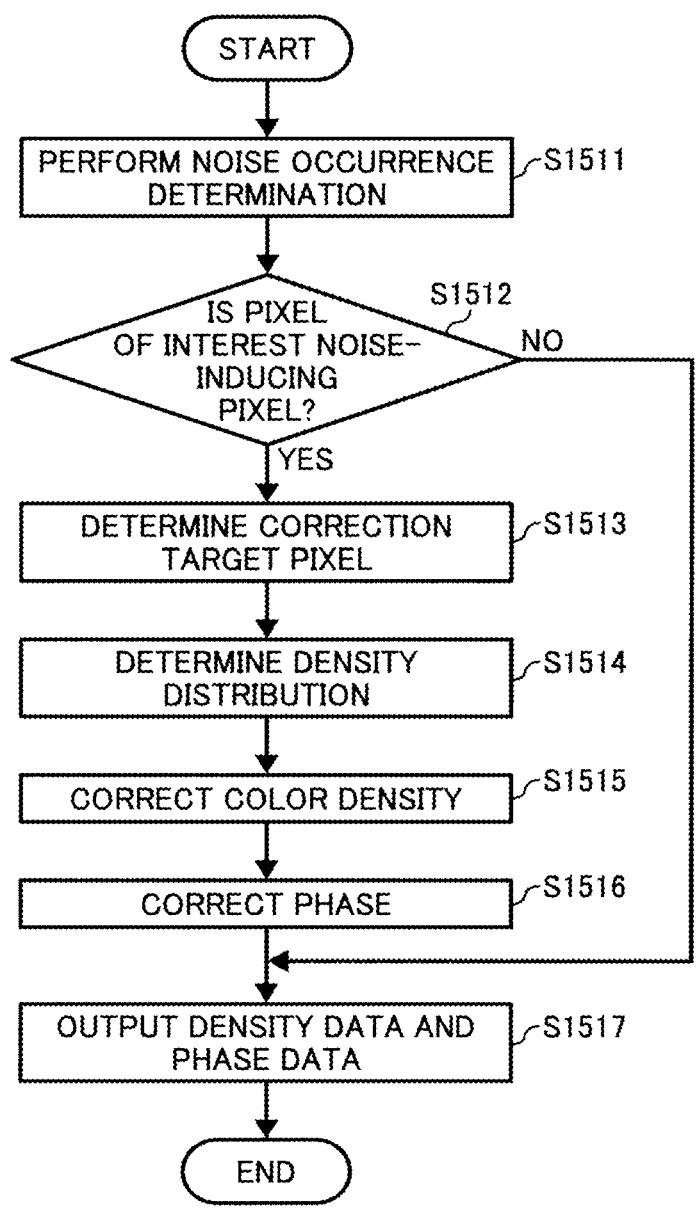
FIG. 29 is a flowchart for explaining how the noise-correction processing unit depicted in FIG. 29 performs density correction and phase correction of image data.

The configuration and process control of the noise-correction processing unit 1353 according to the first embodiment will be described with reference to FIGS. 28 and 29. FIG. 28 is a block diagram of the noise-correction processing unit 1353 according to the first embodiment. FIG. 29 is a flowchart depicting how the noise-correction processing unit 1353 performs density correction and phase correction.

The noise-correction processing unit 1353 includes a noise-occurrence determining unit 1501, a correction-target-pixel selecting unit 1502, a density-distribution determining unit 1503, a density correcting unit 1504, a phase correcting unit 1505, and a corrected-pixel-data output unit 1506. Each of the noise-correction processing unit for Y, M, and C has the similar configuration with that of the noise-correction processing unit 1353 depicted in FIG. 28.

The noise-occurrence determining unit 1501 receives the shift correction information from the skew-output control unit 1352, and determines whether a pixel of interest on the shift position is a noise-inducing pixel that leads to local color density change because of a change in relationship with an adjacent pixel of the noise-inducing pixel (Step S1511).

Figure 30:
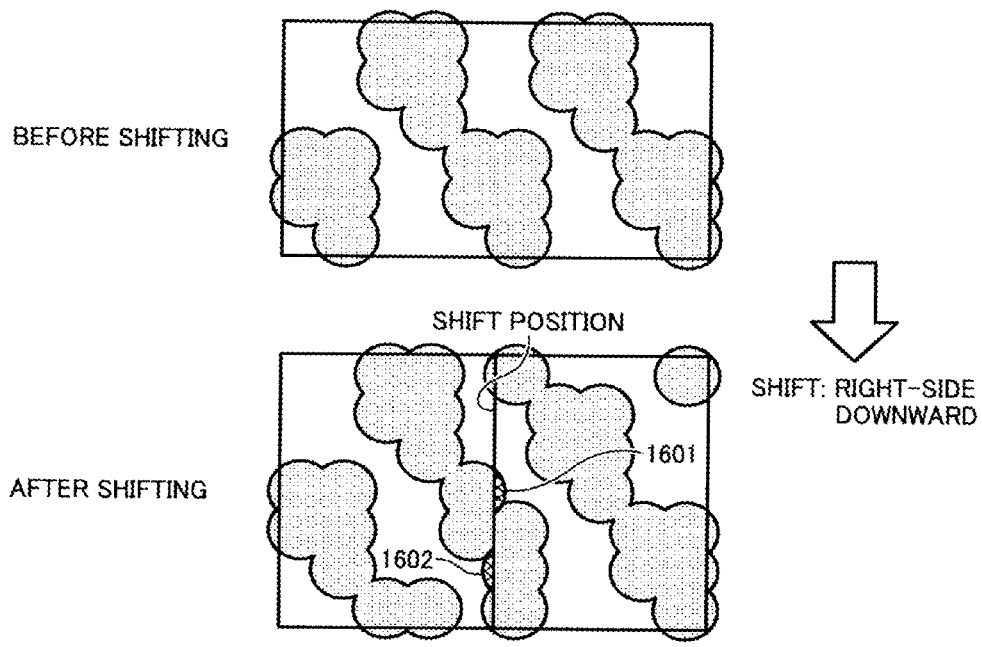
FIG. 30 is a schematic diagram for explaining how a pixel of interest becomes a noise-inducing pixel by way of an example.

FIG. 30 is a schematic diagram for explaining how a pixel of interest becomes a noise-inducing pixel by way of an example. Because a right section of the image is shifted downward in this example, a color density of image data of a pixel-of-interest 1601 and a pixel-of-interest 1602 changes to 0 which is a density value for white pixels. Because a toner area coverage indicated as cross-hatched areas in FIG. 30 hence increases, the noise-occurrence determining unit 1501 determines that the pixel-of-interest 1601 and the pixel-of-interest 1602 are noise-inducing pixels.

Figure 31:
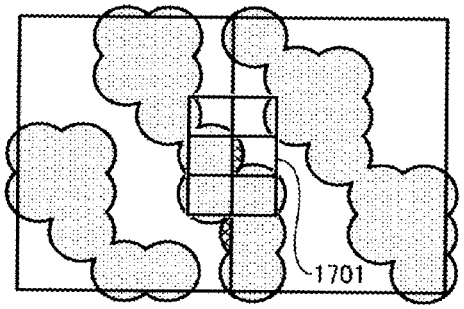
FIG. 31 is a schematic diagram of an example of pixels in the vicinity of a shift position.
Figure 32:
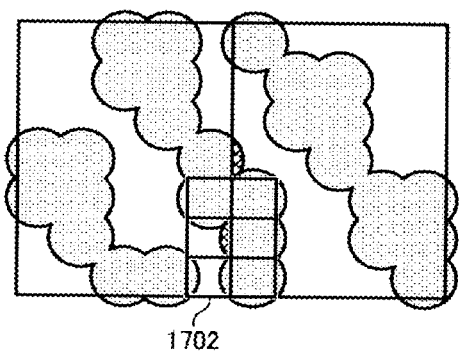
FIG. 32 is a schematic diagram of an example of pixels in the vicinity of the shift position.

In the first embodiment, the noise-occurrence determining unit 1501 determines a pixel of interest as being a noise-inducing pixel when a pixel arrangement and a shift direction of pixels in the vicinity of the shift position match a preset pixel arrangement pattern. This pixel arrangement pattern is such a pattern that when corrective shifting of image data that matches the pixel arrangement pattern is performed, a toner area coverage increases or decreases, resulting in a local increase or decrease of density on an output of the image data. FIGS. 31 and 32 are schematic diagrams of examples of pixels in the vicinity of a shift position. When corrective shifting as depicted in FIG. 30 is performed, the noise-occurrence determining unit 1501 determines whether a pixel of interest is a noise-inducing pixel by comparing a pixel arrangement 1701 of three lines×two pixels depicted in FIG. 31 and a pixel arrangement 1702 of three lines×two pixels depicted in FIG. 32 with a preset pixel arrangement pattern.

In the first embodiment, the noise-occurrence determining unit 1501 determines whether a pixel of interest is a noise-inducing pixel by using image data that has been shifted by the input-image control unit 127; however, other data can be used in this determination. For example, whether a pixel of interest is a noise-inducing pixel can be determined by using not-yet-shifted image data. In a case where the binary image data supplied to the input-image control unit 127 from the image processing unit 124 is converted into 4-bit image data that indicates a color density as a value ranging from 0 to 15, the determination can be made by increasing the number of the pixel arrangement patterns. Alternatively, the determination can be made by using a density value represented by higher-order bits of the 4-bit image data. This permits reduction in the number of bits of image data to be input to the noise-occurrence determining unit 1501.

Figure 33:
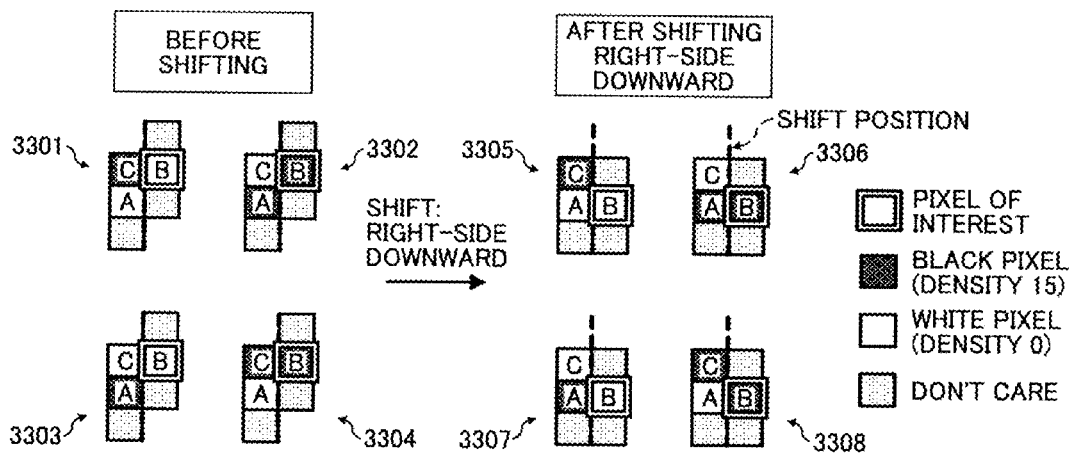
FIG. 33 is a schematic explanatory diagram of pixels in the vicinity of a shift position before and after corrective shifting.
Figure 34:
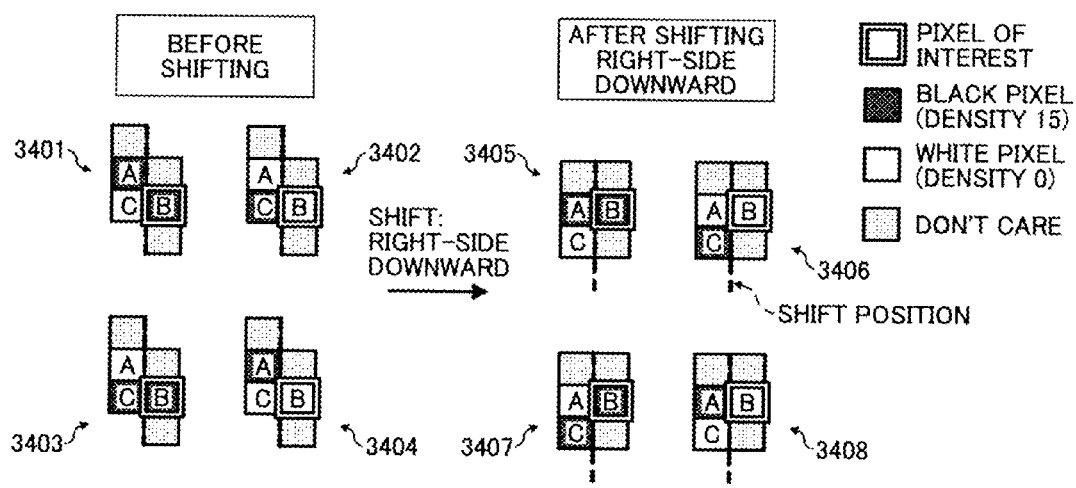
FIG. 34 is another schematic explanatory diagram of pixels in the vicinity of a shift position before and after corrective shifting.

FIGS. 33 and 34 are schematic diagrams for explaining pixels in the vicinity of a shift position before and after corrective shifting. Pixel arrangements 3301 to 3304 of FIG. 33 and pixel arrangements 3401 and 3404 of FIG. 34 are pixels (three lines×two pixels) in the vicinity of the shift position before the corrective shifting. Pixel arrangements 3305 to 3308 of FIG. 33 and pixel arrangements 3405 and 3408 of FIG. 34 are pixels (three lines×two pixels) in the vicinity of the shift position after the corrective shifting. A pixel B is a pixel of interest. Because a pixel adjacent to the pixel B is changed from a pixel C to a pixel A by the corrective shifting, a color density of the pixel adjacent to the pixel B changes. Hence, the noise-occurrence determining unit 1501 determines that the pixel B is a noise-inducing pixel.

Figure 35:
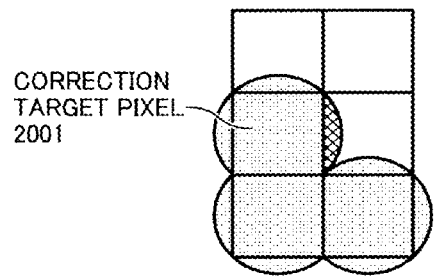
FIG. 35 is a schematic explanatory diagram of a correction target pixel that is determined based on pixels in the vicinity of a shift position.
Figure 36:
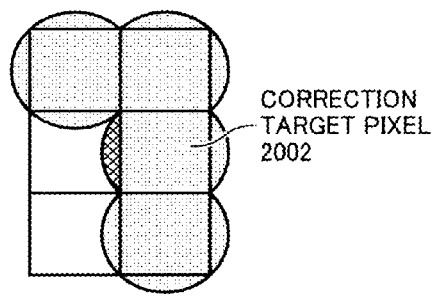
FIG. 36 is a schematic explanatory diagram of a correction target pixel that is determined based on pixels in the vicinity of a shift position.

When the noise-occurrence determining unit 1501 determines that a pixel of interest is a noise-inducing pixel (Yes at Step S1512), the correction-target-pixel selecting unit 1502 determines any one of the pixel of interest and a pixel in the vicinity of the pixel of interest that increases or decreases a color density as a pixel for which density correction of image data is to be performed (hereinafter, "correction target pixel") (Step S1513). FIGS. 35 and 36 are schematic diagrams of examples of correction target pixels that are determined based on the pixels in the vicinity of the shift position.

Assume that, for example, a pixel of interest (pixel having the cross-hatched area) in the pixel arrangement 1701 in the vicinity of the shift position of FIG. 31 is determined as being a noise-inducing pixel. In this case, as depicted in FIG. 35, the correction-target-pixel selecting unit 1502 selects, as the correction target pixel, a pixel 2001 of which toner area coverage has been changed from among the pixels in the pixel arrangement 1701 in the vicinity of the shift position. In contrast, assume that a pixel of interest (pixel having the cross-hatched area) in the pixel arrangement 1702 in the vicinity of the shift position in FIG. 32 is determined as being a noise-inducing pixel. In this case, as depicted in FIG. 36, the correction-target-pixel selecting unit 1502 selects, as the correction target pixel, a pixel 2002 of which toner area coverage has been changed from among the pixels in the pixel arrangement 1702 in the vicinity of the shift position.

More specifically, when image data of the pixel arrangement 3304 of FIG. 33 is output without being subjected to corrective shifting, a toner-overlapping area of the pixel B (black pixel), which is the pixel of interest, and the pixel C (black pixel) does not appear as an additional toner area coverage. On the other hand, when the image data of the pixel arrangement 3304 is subjected to corrective shifting and output as image data of the pixel arrangement 3308 of FIG. 33, the area where the pixel B and the pixel C have overlapped each other before the corrective shifting changes to a toner-overlapping area of the pixel B and a pixel A (white pixel). Accordingly, a toner area coverage increases by an amount of the area where the pixel B and the pixel C have overlapped each other before the corrective shifting. This is because, as described above, a laser beam spot-size is larger than a single pixel area. Hence, the correction-target-pixel selecting unit 1502 selects the pixel B as the correction target pixel from among the pixels in the pixel arrangement 3308 in the vicinity of the shift position of FIG. 33.

When image data of the pixel arrangement 3302 of FIG. 33 is output without being subjected to corrective shifting, a toner-overlapping area of the pixel B (black pixel), which is the pixel of interest, and the pixel C (white pixel) appears as an additional toner area coverage. On the other hand, when the image data of the pixel arrangement 3302 is subjected to corrective shifting and output as image data of the pixel arrangement 3306 of FIG. 33, the toner-overlapping area of the pixel B (black pixel) and the pixel A (black pixel) does not appear as the additional toner area coverage any more. As a result, a total toner area coverage decreases. Hence, the correction-target-pixel selecting unit 1502 selects the pixel A or the pixel C as the correction target pixel from among the pixels in the pixel arrangement 3306 in the vicinity of the shift position of FIG. 33. In this manner, the correction target pixel is uniquely determined from color density distribution of the pixel of interest and pixels in the vicinity of the pixel of interest.

Figure 37:
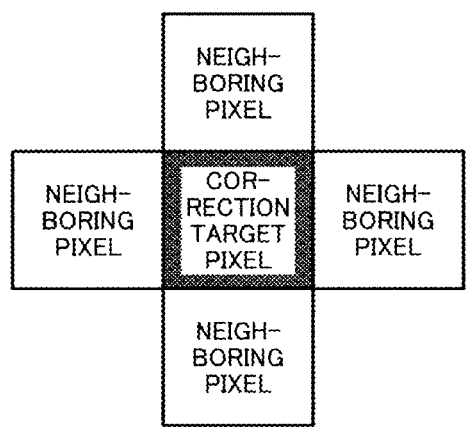
FIG. 37 is a schematic explanatory diagram of neighboring pixels for which color density determination is performed.

The density-distribution determining unit 1503 determines color densities of image data of neighboring pixels that neighbor the pixel determined as the correction target pixel by the correction-target-pixel selecting unit 1502 (Step S1514). FIG. 37 is a schematic explanatory diagram of an example of neighboring pixels for which color density determination is performed. In the first embodiment, the density-distribution determining unit 1503 determines a color density (0 or 15) of image data of each of four neighboring pixels of the correction target pixel. The neighboring pixels are an upper neighboring pixel, a lower neighboring pixel, a left neighboring pixel, and a right neighboring pixel.

Figure 38:
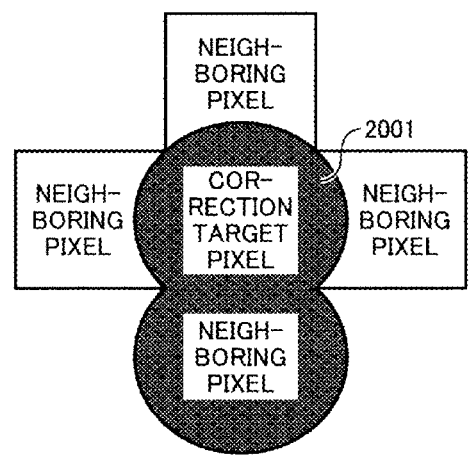
FIG. 38 is a schematic explanatory diagram of upper, lower, left, and right neighboring pixels of the correction target pixel depicted in FIG. 35.
Figure 39:
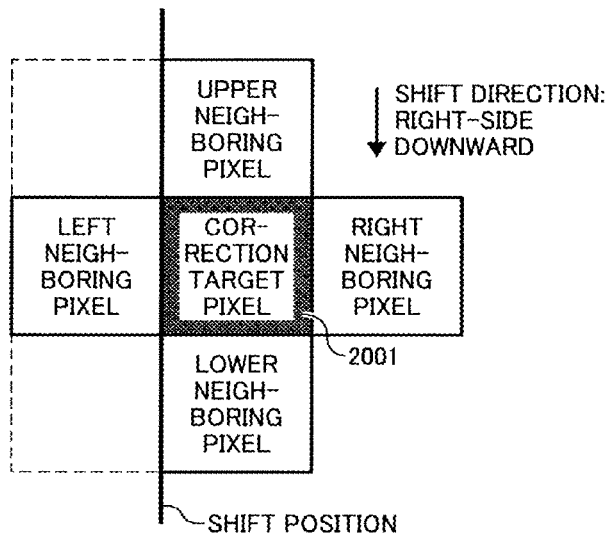
FIG. 39 is a schematic explanatory diagram of pixel sizes of the upper, lower, left, and right neighboring pixels depicted in FIG. 38.

The density correcting unit 1504 corrects the color density of image data of the correction target pixel (Step S1515). The density correcting unit 1504 corrects the color density of the image data of the correction target pixel based on an area on the correction target pixel to be covered by a toner image that would be formed based on the color density determined by the density-distribution determining unit 1503. In the first embodiment, correction of color density is performed in this manner. However, an arbitrary technique for compensating an increase or decrease in color density (toner coverage area) resulting from corrective shifting can be employed. FIG. 38 is a schematic explanatory diagram of the upper, lower, left, and right neighboring pixels of the correction target pixel depicted in FIG. 35. FIG. 39 is a schematic explanatory diagram of pixel sizes of the upper, lower, left, and right neighboring pixels of the correction target pixel. When, for example, the color density of the lower neighboring pixel is 15 (i.e., black pixel) and the color density of the other neighboring pixels is 0 (i.e., white pixel) as depicted in FIG. 38, a toner image of the lower neighboring pixel is greater than its pixel size. In this case, the lower neighboring pixel has a toner area coverage within the correction target pixel 2001. Meanwhile, density correction of the correction target pixel 2001 does not affect the toner area coverage within the lower neighboring pixel. The density correcting unit 1504 corrects a color density of image data of the correction target pixel 2001 so as to appropriately compensate an increase or decrease of the toner area coverage. This correction is performed by correcting the color density of image data of the correction target pixel 2001 based on an area (toner area coverage) of the correction target pixel 2001 to be covered by the neighboring pixels on a toner image. The toner image would be formed based on the color density, 15, of the lower neighboring pixel.

FIGS. 40 to 43 are schematic diagrams for explaining how color density correction of image data of a correction target pixel is performed by way of examples.

Figure 40:
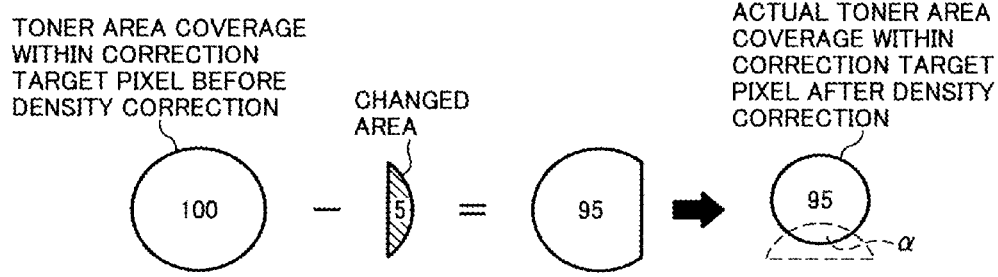
FIGS. 40 to 43 are schematic diagrams for explaining how color density correction of image data of a correction target pixel is performed by way of examples.

A color density of image data of a correction target pixel has been conventionally corrected as depicted in FIG. 40. Specifically, density has been corrected such that a toner area coverage of a correction target pixel after density correction attains 95 that is a value calculated by subtracting a changed area, 5, from a toner area coverage of the correction target pixel before density correction, 100. The changed area is a toner area coverage increased by corrective shifting and indicated as a hatched area in FIG. 40. When the correction target pixel is overlapped by a toner area coverage (region α indicated by a dotted line) of a neighboring pixel, an actual toner area coverage of the correction target pixel after the density correction is an area covered by the intended post-density-correction toner area coverage and the changed area. Put another way, the actual toner area coverage of the correction target pixel after density correction is not equal to the intended toner area coverage after density correction, 95, that is obtained by subtracting the toner area coverage before density correction, 100, from the changed area, 5. Hence, the conventional technique fails to compensate color density corresponding to the actually changed area of the correction target pixel.

To this end, in the first embodiment, the density correcting unit 1504 corrects a color density of image data of a correction target pixel based on a toner area coverage (region α indicated by a dotted line) of the correction target pixel that would be covered by at least one neighboring pixel. More specifically, the density correcting unit 1504 performs density correction such that a portion of the toner area coverage of the correction target pixel, excluding the region α, before the density correction (hereinafter, "pre-density-correction toner area coverage") is equal to a portion of the toner area coverage of the correction target pixel, excluding the region α, after the density correction (hereinafter, "post-density-correction toner area coverage") from which the changed area is subtracted.

Figure 41:
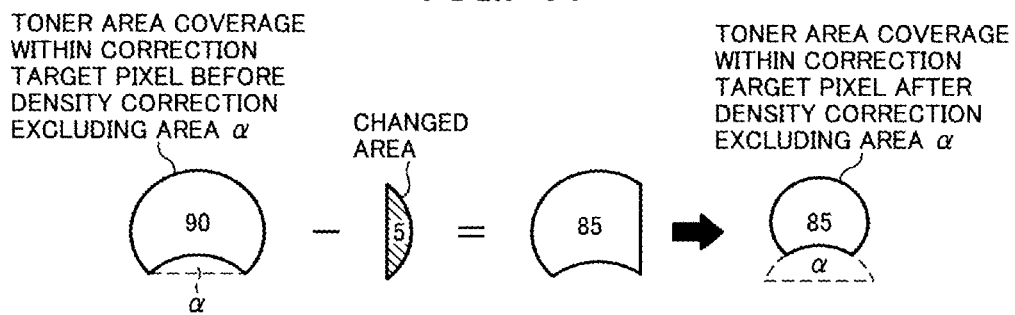

In the example depicted in FIG. 41, a color density of the image data of a correction target pixel is corrected so that a toner area coverage of the correction target pixel, 85, that is obtained by subtracting the changed area, 5, from a pre-density-correction toner area coverage excluding the region α, 90, is equal to 85 that is a post-density-correction toner area coverage excluding the region α, 10. Accordingly, the post-density-correction toner area coverage, 85+10, agrees with a result of subtraction of the changed area, 5, from the pre-density-correction toner area coverage, 100. Hence, a color density corresponding to the changed area can be compensated accurately by excluding a toner area coverage of the lower neighboring pixel on the correction target pixel from the toner area coverage of the correction target pixel.

Figure 42:
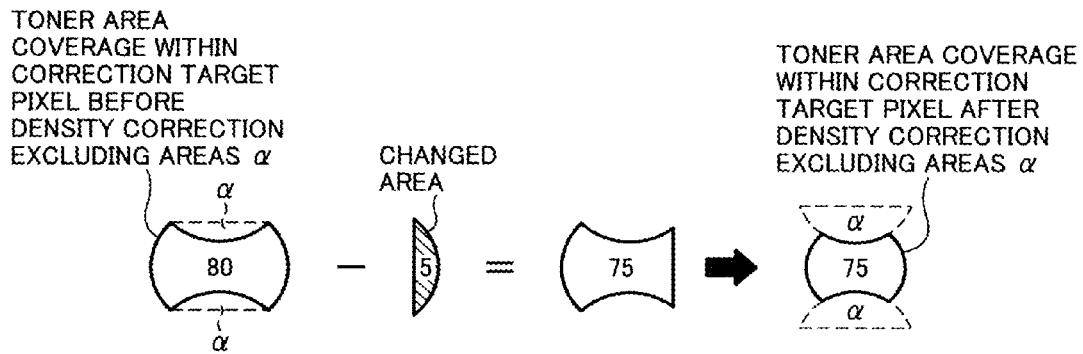

In the example depicted in FIG. 42, the total area of an upper region α and a lower region α is 20. A color density of the image data of a correction target pixel is corrected so that an area, 75, that is obtained by subtracting the changed area, 5, from a pre-density-correction toner area coverage excluding the upper and lower regions α, 80, is equal to a post-density-correction toner area coverage excluding the upper and lower regions α, 75. Accordingly, the post-density-correction toner area coverage, 75+20, agrees with an area obtained by subtracting the changed area, 5, from the pre-density-correction toner area coverage, 100. Hence, a color density corresponding to the changed area can be compensated accurately by excluding a toner area coverage of the lower and upper neighboring pixels on the correction target pixel from the toner area coverage of the correction target pixel.

Figure 43:
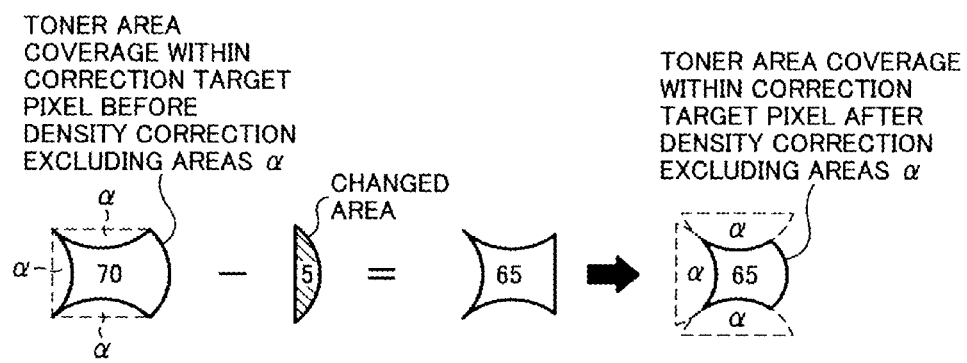

In the example depicted in FIG. 43, a total area of an upper region α, a lower region α, and a left region α is 30. A color density of the image data of a correction target pixel is corrected so that an area, 65, that is obtained by subtracting the changed area, 5, from a pre-density-correction toner area coverage excluding the upper, lower, and the left region α, 70, is equal to a post-density-correction toner area coverage excluding the upper, lower, and the left regions α, 65. Accordingly, the post-density-correction toner area coverage, 65+30, agrees with an area obtained by subtracting the changed area, 5, from the pre-density-correction toner area coverage, 100. Hence, a color density corresponding to the changed area can be compensated accurately by excluding a toner area coverage of the upper, lower, and left neighboring pixels on the correction target pixel from the toner area coverage of the correction target pixel.

How to correct a color density of image data of a correction target pixel will be described by way of an example.

In the first embodiment, the RAM 123 stores therein color densities of image data of upper, lower, left, and right neighboring pixels of a correction target pixel and density correction values. The color densities and the density correction values are mapped to each other. The density correction values depend on a toner area coverage of the correction target pixel to be covered by a toner image that would be formed based on color densities of the image data of neighboring pixels of the correction target pixel. The color densities are determined by the density-distribution determining unit 1503. The density correcting unit 1504 reads from the RAM 123 the density correction value mapped to the color densities, and corrects the color density of the image data of the correction target pixel by using the read density correction value.

Figures 44, 45:
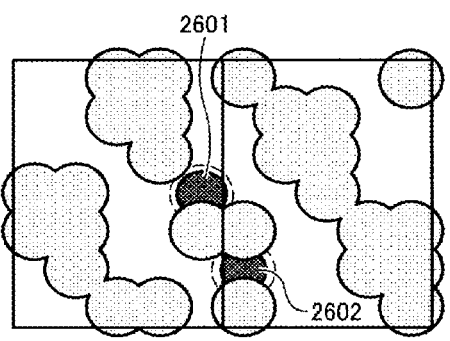
FIG. 44 is a table in which color densities of image data of neighboring pixels of a correction target pixel and density correction values therefor are mapped together.
FIG. 45 is a schematic diagram for explaining how a color density of image data of a correction target pixel is corrected by way of an example.

FIG. 44 is a table in which color densities of image data of neighboring pixels and density correction values are mapped together. The density correction value depends on an area on the correction target pixel to be covered by a toner image that would be formed based on color densities of image data of neighboring pixels of the correction target pixel. In the first embodiment, it is assumed that this table is stored in the RAM 123 in advance. The density correcting unit 1504 reads a density correction value mapped to color densities of the image data of the upper, lower, left, and right neighboring pixels (hereinafter, "neighboring-pixel color densities") from the table. The density correcting unit 1504 corrects the color density of the image data of the correction target pixel (hereinafter, "target-pixel color density") by using the read density correction value. In the first embodiment, it is assumed that a neighboring pixel whose color density is 15 is the neighboring pixel that has a toner area coverage overlapping the correction target pixel on a toner image.

It is depicted in FIG. 35 that the target-pixel color density is 15 and color densities of its upper, lower, left, and right neighboring pixels are 0, 15, 0, and 0, respectively. In this case, the density correcting unit 1504 reads the density correction value −4 corresponding to the pattern 4 from the table depicted in FIG. 44, and obtains 11 by subtracting 4 from the previous color density, 15. The density correcting unit 1504 then corrects the target-pixel color density to this value, 11. It is depicted in FIG. 36 that the target-pixel color density is 15 and color densities of its upper, lower, left, and right neighboring pixels are 15, 15, 0, and 0, respectively. In this case, the density correcting unit 1504 reads the density correction value −5 corresponding to the pattern 6 from the table depicted in FIG. 44, and obtains 10 by subtracting 5 from the previous color density, 15. The density correcting unit 1504 then corrects the target-pixel color density to this value, 10.

FIG. 45 is a schematic diagram for explaining how a color density of image data of a correction target pixel is corrected by way of an example. Dotted lines indicate a pre-density-correction toner area coverage. In the first embodiment, because a target-pixel color density is corrected based on an area on the correction target pixel covered by a toner image that would be formed based on a neighboring pixel of the correction target pixel, an increase or decrease of color density resulting from corrective shifting can be compensated accurately. For example, the changed area of a correction target pixel 2602 depicted in FIG. 45 is equal to the changed area of a correction target pixel 2601. However, because correction is performed based on areas on the correction target pixels to be covered by toner images that would be formed based on their neighboring pixels, a toner area coverage within the correction target pixel 2601 is greater than a toner area coverage within the correction target pixel 2602. This is because while the correction target pixel 2601 is to be covered only by the toner image that would be formed based on its lower neighboring pixel, the toner image that would be formed based on the correction target pixel 2602 is to be covered by the toner image that would be formed based on its lower and upper neighboring pixels.

In this manner, according to the first embodiment, a color density of image data of a correction target pixel is corrected based on an area on the correction target pixel covered by a toner image of at least one neighboring pixel of the correction target pixel. Hence, an increase or decrease in the color density resulting from corrective shifting can be compensated accurately.

Meanwhile, the LD-data output unit 133 (133K, 133M, 133C, 133Y) outputs image data at an output point in time (hereinafter, "output time point") in a pixel period (cycle) of each pixel during which the image data can be output. When the density correction is performed on image data of a correction target pixel by the density correcting unit 1504, the phase correcting unit 1505 appends phase data based on which an output time point to the image data is to be corrected. Based on the phase data, the output time point is advanced or delayed such that the image data is output at a position that is displaced from a center position corresponding to a center point in time (hereinafter, "center time point") of the pixel period of the correction target pixel toward or away from the shift position (Step S1516).

In the first embodiment, the phase correcting unit 1505 uses 2-bit phase data, and appends any one of 00, 10, and 01 to image data. More specifically, the phase correcting unit 1505 appends 00 to image data not to change an output time point of the image data from the center time point of the pixel period (phase unchanged), appends 10 to delay the output time point relative to the center time point (leftward phase correction), and appends 01 to advance the output time point relative to the center time point (rightward phase correction).

Figure 46:
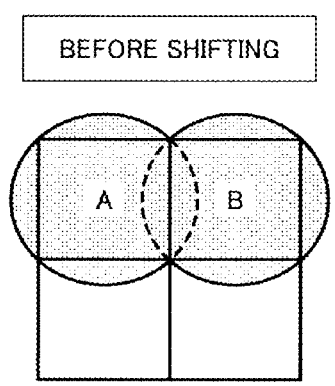
FIG. 46 is a schematic diagram of an exemplary pixel arrangement in a state before it is subjected to corrective shifting.
Figure 47:
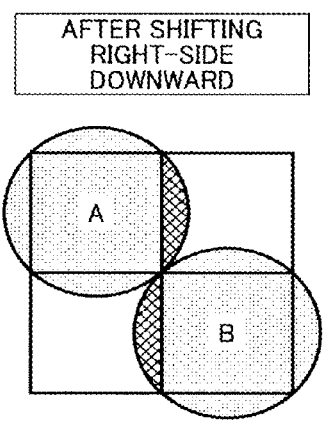
FIG. 47 is a schematic diagram of the pixel arrangement depicted in FIG. 46 of which right side has been shifted downward.
Figure 48:
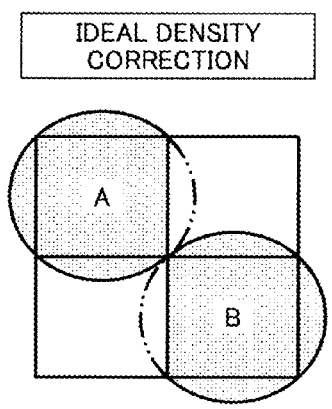
FIG. 48 is a schematic diagram for explaining ideal density correction for compensating an increase in color density.
Figure 49:
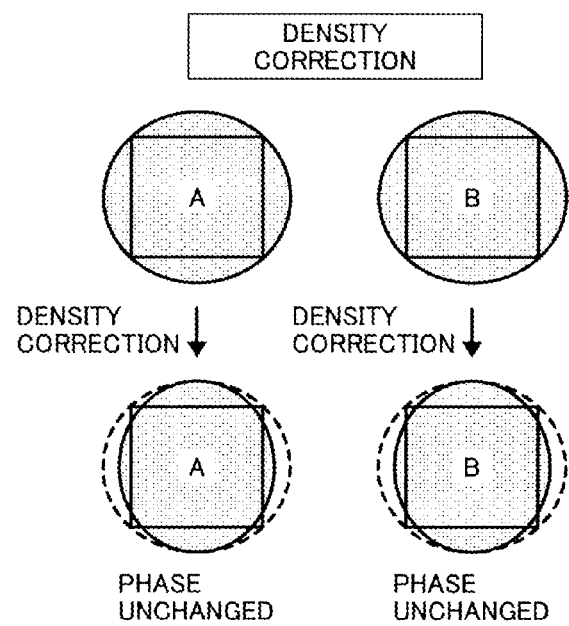
FIGS. 49 and 50 are schematic diagrams for explaining conventional density correction for compensating an increase in color density.
Figure 50:
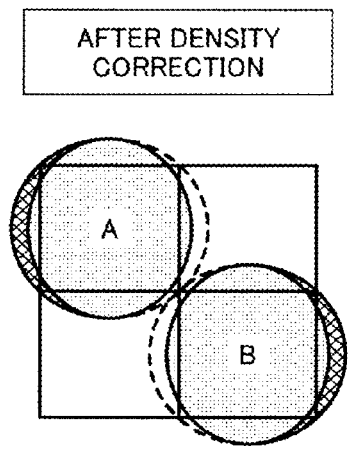

FIG. 46 is a schematic diagram of an exemplary pixel arrangement in a state before it is subjected to the corrective shifting. FIG. 47 is a schematic diagram of the pixel arrangement of which right side has been shifted downward. FIG. 48 is a schematic diagram for explaining ideal density correction for compensating an increase in color density. FIGS. 49 and 50 are schematic diagrams for explaining conventional density correction for compensating an increase in color density. When a pixel B is shifted downward from the state depicted in FIG. 46, the total toner area coverage of a pixel (correction target pixel) A and the pixel (correction target pixel) B increase by an area indicated by cross-hatching in FIG. 47. Accordingly, it is ideal to correct a color density of the pixel A (pixel B) so as to exclude the area indicated by cross-hatching from the toner area coverage of the pixel A (pixel B) as depicted in FIG. 48.

However, when the conventional density correction is performed on the pixel arrangement depicted in FIG. 47, the toner area coverage of the pixel A (pixel B) is reduced by bilaterally-symmetrical areas as depicted in FIG. 49. More specifically, the areas indicated by cross-hatching in FIG. 50 (i.e., portions that do not lead to banding noise) are undesirably removed from the toner area coverage. Hence, the conventional density correction fails to increase the toner area coverage by the area indicated by the dotted lines in FIG. 50 and therefore fails to bring an image having undergone the density correction close to a not-yet-density-corrected image. This can become another cause of degradation in image quality.

Figure 51:
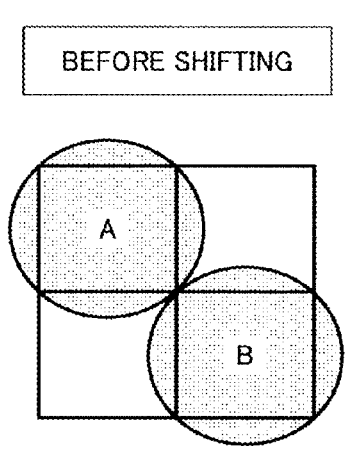
FIG. 51 is a schematic diagram of an exemplary pixel arrangement in a state before it is subjected to corrective shifting.
Figure 52:
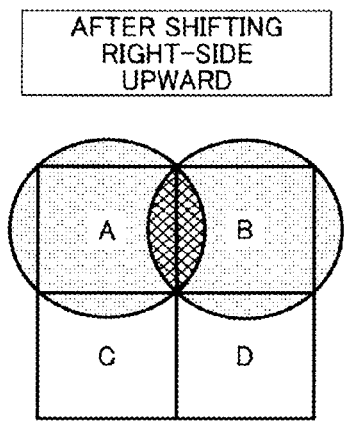
FIG. 52 is a schematic diagram of the pixel arrangement depicted in FIG. 51 of which right side has been shifted upward.
Figure 53:
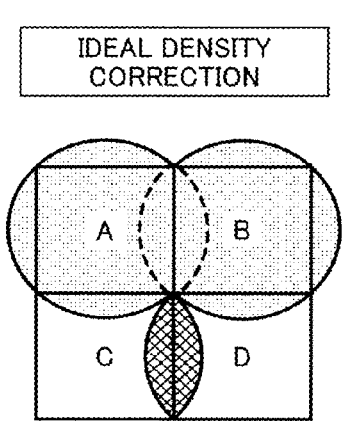
FIG. 53 is a schematic diagram for explaining ideal density correction for compensating a decrease in color density.
Figure 54:
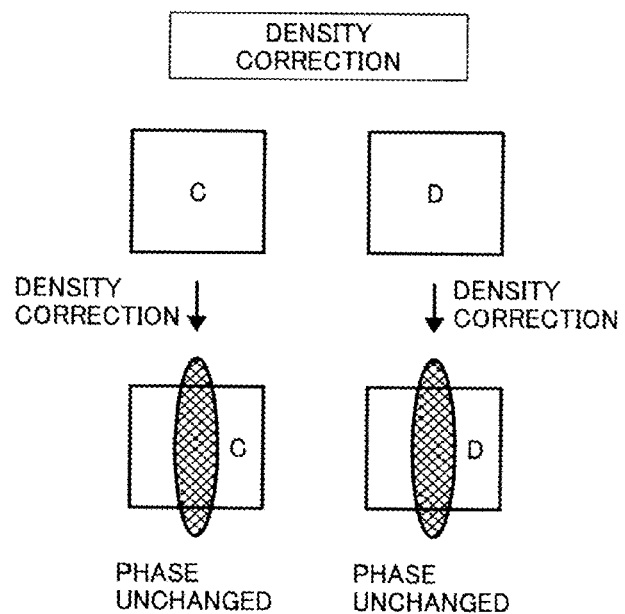
FIGS. 54 and 55 are schematic diagrams for explaining conventional density correction for compensating a decrease in color density.
Figure 55:
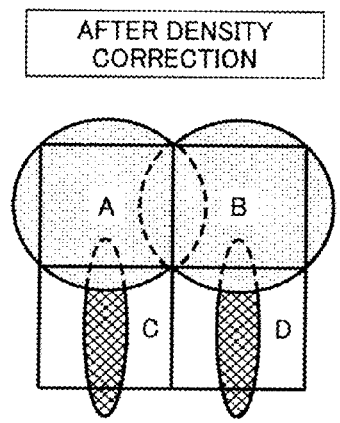

FIG. 51 is a schematic diagram of an exemplary pixel arrangement in a state before it is subjected to corrective shifting. FIG. 52 is a schematic diagram of the pixel arrangement of which right side has been shifted upward. FIG. 53 is a schematic diagram for explaining ideal density correction for compensating decrease in color density. FIGS. 54 and 55 are schematic diagrams for explaining conventional density correction for compensating a decrease in color density. When a pixel B is shifted upward from the state depicted in FIG. 51, the total toner area coverage of a pixel A (correction target pixel) and the pixel B (correction target pixel) decrease by an area indicated by cross-hatching in FIG. 52. Accordingly, it is ideal to correct a color density of a pixel C (pixel D) so as to increase the toner coverage area by the area indicated by cross-hatching as depicted in FIG. 53.

However, when the conventional density correction is performed on the pixel arrangement depicted in FIG. 52, a toner image of the pixel C (pixel D) having undergone the density correction is formed at a center time point (phase unchanged) of the pixel C (pixel D). Accordingly, the areas indicated by cross-hatching in FIGS. 54 and 55 (i.e., portions that do not lead to banding noise) are undesirably added to the toner area coverage. Hence, the conventional density correction fails to increase the toner area coverage by the area indicated by cross-hatching in FIG. 53 and therefore fails to bring an image having undergone the density correction close to a not-yet-density-corrected image. This can become another cause of degradation in image quality.

To this end, the phase correcting unit 1505 performs output-time point correction on image data based on information about an arrangement of a target correction pixel and its neighboring pixels and a shift direction in shift correction information. The phase correcting unit 1505 receives the information about the pixel arrangement from the density correcting unit 1504, and receives the shift correction information from the skew-output control unit 1352. For example, when it is determined that a color density of image data of a correction target pixel would increase based on a shift direction and a pixel arrangement of the correction target pixel and its neighboring pixels in shift correction information, the phase correcting unit 1505 advances or delays an output time point of the image data of the correction target pixel from the center time point in the pixel period such that the image data is output at a position displaced from a center position corresponding to the center time point toward the shift position.

Figure 56:
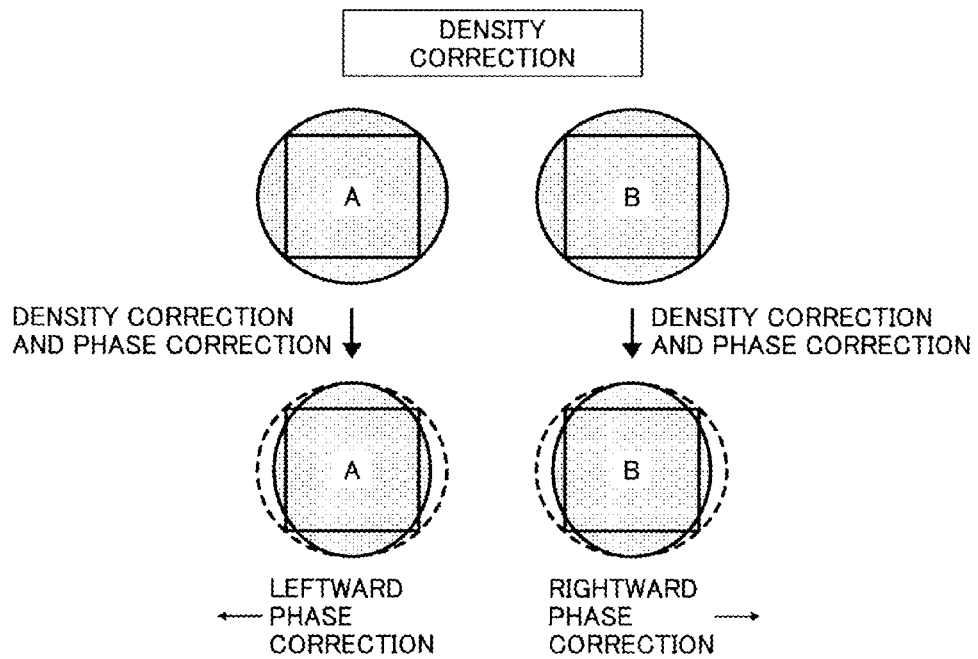
FIGS. 56 and 57 are schematic diagrams for explaining output-time point correction according to the first embodiment for compensating an increase in color density.
Figure 57:
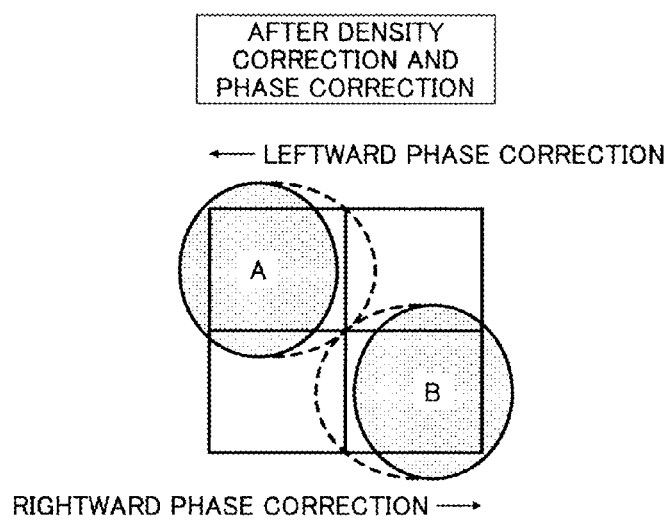

FIGS. 56 and 57 are schematic exemplary diagrams for explaining output time point correction according to the first embodiment performed for correcting an increase in color density of image data. As depicted in FIG. 56, the phase correcting unit 1505 delays an output time point of image data of the density-corrected pixel A from a center time point in a pixel period of the pixel A so as to output the image data at a position displaced away from the shift position (leftward phase correction). In this case, the phase correcting unit 1505 outputs 10, which is the data for leftward phase correction, as phase data to be appended to the image data of the pixel A. Similarly, the phase correcting unit 1505 advances an output time point of image data of the density-corrected pixel B from a center time point in a pixel period of the pixel B so as to output the image data at a position displaced away from the shift position (rightward phase correction). In this case, the phase correcting unit 1505 outputs 11, which is the data for rightward phase correction, as phase data to be appended to the image data of the pixel B. This permits the phase correcting unit 1505 to reduce only the areas indicated by dotted lines in FIG. 57 from the toner area coverage of the pixel A and that of the pixel B.

Figure 58:
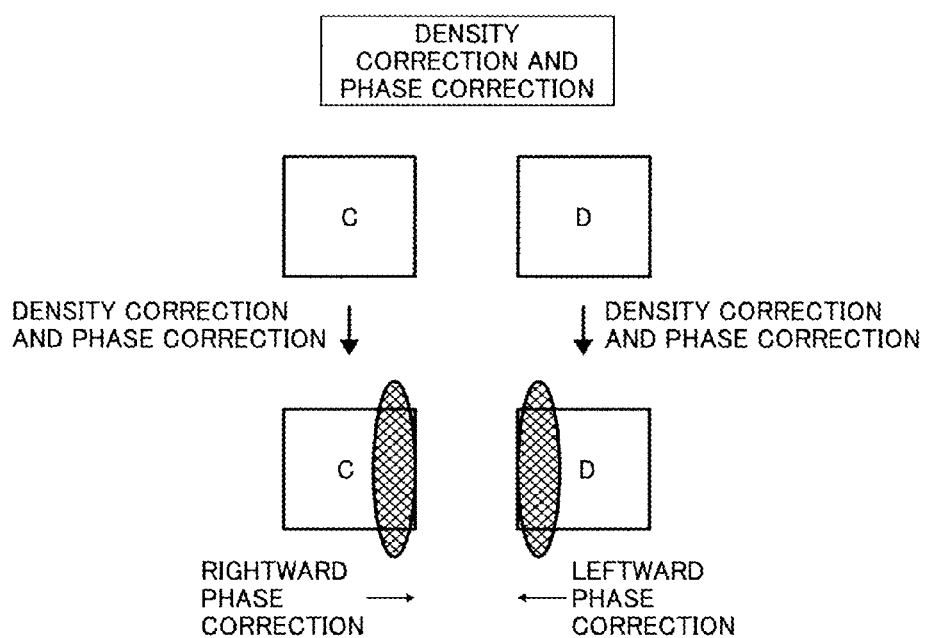
FIGS. 58 and 59 are schematic exemplary diagrams for explaining output-time point correction according to the first embodiment for compensating a decrease in color density.
Figure 59:
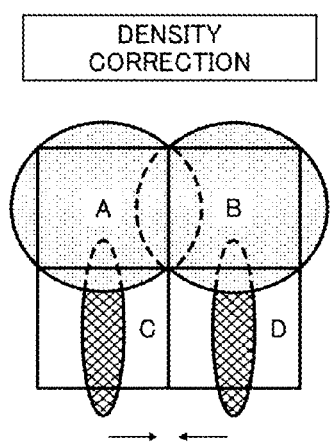

FIGS. 58 and 59 are schematic exemplary diagrams for explaining output-time point correction according to the first embodiment performed for correcting a decrease in color density of image data. As depicted in FIG. 58, the phase correcting unit 1505 advances an output time point of image data of the density-corrected pixel C from a center time point in a pixel period of the pixel C so as to output the image data at a position displaced toward the shift position (rightward phase correction). In this case, the phase correcting unit 1505 outputs 11, which is the data for rightward phase correction, as phase data to be appended to the image data of the pixel C. Similarly, the phase correcting unit 1505 delays an output time point of image data of the density-corrected pixel D from a center time point in a pixel period of the pixel D so as to output the image data at a position displaced toward the shift position (leftward phase correction). In this case, the phase correcting unit 1505 outputs 10, which is the data for leftward phase correction, as phase data to be appended to the image data of the pixel D. This permits the phase correcting unit 1505 to correct the areas indicated by cross-hatching in FIG. 59 of the toner area coverage of the pixel C and that of the pixel D to the areas indicated by cross-hatching in FIG. 58.

When a bidirectional scanning method with which the exposure unit 9 performs rightward horizontal scanning for two colors (for example, K and M) of Y, M, C, and K and leftward horizontal scanning for the other two colors (for example, C and Y) is employed, the write control units 126C and 126Y write laterally reversed images. Accordingly, the phase correcting unit 1505 outputs laterally-reversed phase data so that actually-formed toner images of the four colors are appropriately positioned.

The corrected-pixel-data output unit 1506 receives the phase data from the phase correcting unit 1505 and the image data (density data) from the density correcting unit 1504, and outputs the image data, to which the phase data is appended, to the write-image processing unit 131 (Step S1517). When the pixel of interest is determined as not being a noise-inducing pixel (No at Step S1512), the corrected-pixel-data output unit 1506 receives the phase data from the phase correcting unit 1505 and the image data (density data) from the data selector 1351, and outputs the image data, to which the phase data is appended, to the write-image processing unit 131 (Step S1517). The LD-data output unit 133 outputs LD light-emission signals according to the image data (density data) and the phase data of each pixel. The LD light-emission data is used to control light emission from the LDs by using a pulse width modulation (PWM) control technique.

In this manner, when density correction is performed on a correction target pixel, the noise-correction processing unit 1353 according to the first embodiment corrects an output position at which image data of the correction target pixel is to be output by advancing or delaying an output time point in a pixel period of the image data. This correction of the output time point is performed such that the position where the image data is to be output is displaced from a center position that corresponds to a center time point in the pixel period away from or toward a shift position in a direction toward a portion where local color density change does not occur. Accordingly, this correction permits, in an image to be formed based on pixels subjected to density correction, a portion that does not lead to banding noise due to skew correction to be formed close to a not-yet-density-corrected image. Hence, degradation in image quality resulting from density correction that is performed as a part of skew correction can be minimized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a skew correction unit that performs skew correction on image data by dividing pixels that belong to one line in a main-scanning direction of the image data into pixel blocks at least one shift position and shifting a pixel block of the pixel blocks in a sub-scanning direction against a direction of skew;
a noise determining unit that determines whether a pixel of interest that is on the shift position is a noise-inducing pixel, the pixel of interest being each pixel on the shift position, the noise-inducing pixel being a pixel that leads to a local color density change because of a change in relationship with an adjacent pixel of the noise-inducing pixel;
a selecting unit that selects, when the pixel of interest is determined as being the noise-inducing pixel, any one of the pixel of interest and a pixel in vicinity of the pixel of interest as a correction target pixel on which color density correction is to be performed;
a first correcting unit that performs the color density correction on density-not-yet-corrected image data of the correction target pixel to acquire density-corrected image data; and
a second correcting unit that corrects an output point in time at which the density-corrected image data is to be output, the output point in time falling within a pixel period during which the density-corrected image data of the correction target pixel can be output, such that the image data of the correction target pixel is output at an output position that is displaced from a center position corresponding to a center point in time of the pixel period in any one of a direction toward the shift position and a direction away from the shift position,
wherein:
when a color density of the density-corrected image data is determined to decrease as compared to a color density of the density-not-yet-corrected image data, the second correcting unit corrects the output point in time such that the output position is displaced toward the shift position, and
when the color density of the density-corrected image data is determined to increase as compared to the color density of the density-not-yet-corrected image data, the second correcting unit corrects the output point in time such that the output position is displaced away from the shift position.

2. The image forming apparatus according to claim 1, wherein the second correcting unit determines whether any one of an increase and a decrease in the color density of the density-corrected image data as compared to the color density of the density-not-yet-corrected image data would occur based on a pixel arrangement of the correction target pixel and a neighboring pixel of the correction target pixel and a shift direction, the shift direction being the sub-scanning direction against the direction of skew.

3. An image forming method comprising:
- performing skew correction on image data by dividing pixels that belong to one line in a main-scanning direction of the image data into pixel blocks at least one shift position and shifting a pixel block of the pixel blocks in a sub-scanning direction against a direction of skew;
- determining whether a pixel of interest that is on the shift position is a noise-inducing pixel, the pixel of interest being each pixel on the shift position, the noise-inducing pixel being a pixel that leads to a local color density change because of a change in relationship with an adjacent pixel of the noise-inducing pixel;
- selecting, when the pixel of interest is determined as being the noise-inducing pixel at the determining, any one of the pixel of interest and a pixel in vicinity of the pixel of interest as a correction target pixel on which color density correction is to be performed;
- performing the color density correction on density-not-yet-corrected image data of the correction target pixel to acquire density-corrected image data; and
- correcting an output point in time at which the density-corrected image data is to be output, the output point in time falling within a pixel period during which the density-corrected image data of the correction target pixel can be output, such that the image data of the correction target pixel is output at an output position that is displaced from a center position corresponding to a center point in time of the pixel period in any one of a direction toward the shift position and a direction away from the shift position, wherein
when a color density of the density-corrected image data is determined to decrease as compared to a color density of the density-not-yet-corrected image data, the correcting includes correcting the output point in time such that the output position is displaced toward the shift position, and when the color density of the density-corrected image data is determined to increase as compared to the color density of the density-not-yet-corrected image data, the correcting includes correcting the output point in time such that the output position is displaced away from the shift position.

4. The image forming method according to claim 3, wherein the correcting includes determining whether any one of an increase and a decrease in the color density of the density-corrected image data as compared to the color density of the density-not-yet-corrected image data would occur based on a pixel arrangement of the correction target pixel and a neighboring pixel of the correction target pixel and a shift direction, the shift direction being the sub-scanning direction against the direction of skew.

5. A non-transitory computer-readable recording medium including a computer program stored on the readable recording medium, the computer program when executed on a computer causes the computer to execute:
- performing skew correction on image data by dividing pixels that belong to one line in a main-scanning direction of the image data into pixel blocks at least one shift position and shifting a pixel block of the pixel blocks in a sub-scanning direction against a direction of skew;
- determining whether a pixel of interest that is on the shift position is a noise-inducing pixel, the pixel of interest being each pixel on the shift position, the noise-inducing pixel being a pixel that leads to a local color density change because of a change in relationship with an adjacent pixel of the noise-inducing pixel;
- selecting, when the pixel of interest is determined as being the noise-inducing pixel at the determining, any one of the pixel of interest and a pixel in vicinity of the pixel of interest as a correction target pixel on which color density correction is to be performed;
- performing the color density correction on density-not-yet-corrected image data of the correction target pixel to acquire density-corrected image data; and
- correcting an output point in time at which the density-corrected image data is to be output, the output point in time falling within a pixel period during which the density-corrected image data of the correction target pixel can be output, such that the image data of the correction target pixel is output at an output position that is displaced from a center position corresponding to a center point in time of the pixel period in any one of a direction toward the shift position and a direction away from the shift position, wherein:
when a color density of the density-corrected image data is determined to decrease as compared to a color density of the density-not-yet-corrected image data, the correcting includes correcting the output point in time such that the output position is displaced toward the shift position, and when the color density of the density-corrected image data is determined to increase as compared to the color density of the density-not-yet-corrected image data, the correcting includes correcting the output point in time such that the output position is displaced away from the shift position.

6. The non-transitory computer-readable recording medium according to claim 5, wherein the correcting includes determining whether any one of an increase and a decrease in the color density of the density-corrected image data as compared to the color density of the density-not-yet-corrected image data would occur based on a pixel arrangement of the correction target pixel and a neighboring pixel of the correction target pixel and a shift direction, the shift direction being the sub-scanning direction against the direction of skew.

* * * * *